United States Patent
Jain et al.

(10) Patent No.: US 10,257,746 B2
(45) Date of Patent: Apr. 9, 2019

(54) INTERFERENCE CANCELLATION METHODS AND APPARATUS

(71) Applicant: GenXComm, Inc., Austin, TX (US)

(72) Inventors: Hardik Jain, Austin, TX (US); Che-Chun Lin, Austin, TX (US)

(73) Assignee: GenXComm, Inc., Austin, TX (US)

( * ) Notice: Subject to any disclaimer, the term of this patent is extended or adjusted under 35 U.S.C. 154(b) by 0 days.

(21) Appl. No.: 15/623,369

(22) Filed: Jun. 14, 2017

(65) Prior Publication Data

US 2018/0063745 A1    Mar. 1, 2018

Related U.S. Application Data

(60) Provisional application No. 62/363,263, filed on Jul. 16, 2016, provisional application No. 62/518,578, filed on Jun. 12, 2017.

(51) Int. Cl.
| | |
|---|---|
| *H04B 10/00* | (2013.01) |
| *H04W 28/04* | (2009.01) |
| *H04L 25/03* | (2006.01) |
| *H04B 10/2575* | (2013.01) |

(52) U.S. Cl.
CPC ...... *H04W 28/04* (2013.01); *H04B 10/25752* (2013.01); *H04L 25/03006* (2013.01); *H04W 28/048* (2013.01)

(58) Field of Classification Search
USPC ................................................. 398/39, 115
See application file for complete search history.

(56) References Cited

U.S. PATENT DOCUMENTS

| | | | | |
|---|---|---|---|---|
| 4,608,569 A | * | 8/1986 | Dickey, Jr. | G01S 7/527 342/384 |
| 5,757,312 A | * | 5/1998 | Szmurlo | G01S 7/038 342/159 |
| 6,760,454 B1 | * | 7/2004 | Shreve | H04R 1/083 340/10.41 |
| 7,130,289 B2 | | 10/2006 | Kuan et al. | |
| 7,853,195 B2 | * | 12/2010 | Higgins | H04B 1/525 455/1 |

(Continued)

FOREIGN PATENT DOCUMENTS

| | | |
|---|---|---|
| RU | 2474056 C1 | 1/2013 |
| WO | 2007092767 A1 | 8/2007 |

OTHER PUBLICATIONS

Pratt V.K., Laser Communication Systems, 1972, pp. 65-71, Syvaz, Moscow.

(Continued)

*Primary Examiner* — Agustin Bello
(74) *Attorney, Agent, or Firm* — Hunt Pennington Kumar & Dula, PLLC; Sanjeev Kumar

(57) ABSTRACT

Methods and apparatus for reducing and/or canceling signal interference between receiver and transmitter components of a wireless communications device are described. The methods and apparatus are well suited for use in a wide range of devices including user equipment devices such as cell phones as well as in network equipment such a base stations. Opto-mechanical devices are used in some embodiments as part of an apparatus which performs interference cancelation on RF (Radio Frequency) signals.

22 Claims, 17 Drawing Sheets

(56) References Cited

U.S. PATENT DOCUMENTS

| | | | | |
|---|---|---|---|---|
| 8,078,130 B2* | 12/2011 | Fudge | H04B 1/1036 | 455/295 |
| 8,081,946 B2* | 12/2011 | Fudge | H04B 1/1036 | 455/295 |
| 8,320,504 B2* | 11/2012 | Peng | H04B 1/525 | 375/327 |
| 8,600,200 B1* | 12/2013 | Rakich | G02F 1/125 | 385/1 |
| 8,781,030 B2* | 7/2014 | Peng | H04B 1/525 | 375/327 |
| 9,252,857 B2* | 2/2016 | Negus | H04B 7/0486 | |
| 9,268,092 B1* | 2/2016 | Jarecki, Jr. | G02F 1/11 | |
| 9,391,667 B2* | 7/2016 | Sundstrom | H04B 1/50 | |
| 9,571,205 B1* | 2/2017 | Suarez | G02F 2/002 | |
| 9,602,149 B1* | 3/2017 | Tanzi | H04B 17/318 | |
| 9,696,492 B1* | 7/2017 | Cox | G02B 6/1225 | |
| 9,712,233 B1* | 7/2017 | Deng | H04B 10/11 | |
| 9,774,364 B2* | 9/2017 | Shih | H04B 1/48 | |
| 9,923,708 B2* | 3/2018 | Khandani | H04L 5/14 | |
| 2004/0264610 A1* | 12/2004 | Marro | H04R 3/00 | 375/347 |
| 2005/0286904 A1 | 12/2005 | Calabro et al. | | |
| 2008/0192876 A1* | 8/2008 | Dulger | H03L 7/1806 | 375/376 |
| 2009/0061808 A1* | 3/2009 | Higgins | H04B 1/525 | 455/306 |
| 2010/0159866 A1* | 6/2010 | Fudge | H04B 1/1036 | 455/302 |
| 2010/0220780 A1* | 9/2010 | Peng | H04B 1/525 | 375/232 |
| 2011/0065409 A1* | 3/2011 | Kenington | H04B 1/126 | 455/307 |
| 2011/0171920 A1* | 7/2011 | Kim | H04B 1/525 | 455/257 |
| 2011/0171922 A1* | 7/2011 | Kim | H04B 1/525 | 455/307 |
| 2012/0294608 A1* | 11/2012 | Prucnal | H04B 1/109 | 398/39 |
| 2013/0083917 A1* | 4/2013 | Peng | H04B 1/525 | 379/406.09 |
| 2013/0230328 A1 | 9/2013 | Fan et al. | | |
| 2013/0286903 A1* | 10/2013 | Khojastepour | H04L 5/14 | 370/280 |
| 2013/0308732 A1* | 11/2013 | Kpodzo | H04B 1/1027 | 375/346 |
| 2014/0130601 A1* | 5/2014 | Zhou | G01S 7/521 | 73/655 |
| 2014/0169236 A1* | 6/2014 | Choi | H04L 5/1461 | 370/278 |
| 2014/0204808 A1* | 7/2014 | Choi | H04L 5/143 | 370/278 |
| 2014/0218240 A1* | 8/2014 | Kpodzo | G01S 19/21 | 342/450 |
| 2014/0219139 A1* | 8/2014 | Choi | H04L 5/1461 | 370/278 |
| 2016/0135191 A1* | 5/2016 | Negus | H04B 7/0486 | 370/329 |
| 2016/0359552 A1* | 12/2016 | Monsen | H04B 7/18528 | |
| 2016/0380706 A1* | 12/2016 | Tanzi | H04B 1/123 | 455/78 |
| 2017/0170903 A1* | 6/2017 | Jain | H04B 10/25752 | |
| 2018/0006795 A1* | 1/2018 | Raaf | H04B 1/44 | |
| 2018/0034550 A1* | 2/2018 | Rakich | H04B 10/516 | |
| 2018/0063745 A1* | 3/2018 | Jain | H04W 28/048 | |

OTHER PUBLICATIONS

Notification of Transmittal of the International Search Report and the Written Opinion of the International Searching Authority, or the Declaration including the International Search Report and the Written Opinion of the International Searching Authority from Application No. PCT/US 2017/042142, dated Oct. 26, 2017, pp. 1-7.

* cited by examiner

INTERFERENCE CANCELLATION METHODS AND APPARATUS

RELATED APPLICATIONS

The present application claims the benefit of U.S. Provisional Patent Application Ser. No. 62/363,263 filed on Jul. 16, 2016 and U.S. Provisional Patent Application Ser. No. 62/518,578 filed on Jun. 12, 2017 each of which is hereby expressly incorporated by reference in its entirety.

FIELD

Various embodiments relate to communications methods and apparatus and, more specifically, to methods and apparatus for interference cancellation in communications devices and/or systems.

BACKGROUND

Self interference is a problem for wireless and other communications devices which attempt to send, e.g., transmit, and receive at the same time using electrical or wireless signals. While different frequency bands may be used for sending, e.g., uplink, and receiving, e.g., downlink, some of the signal being transmitted may be received by a receiver of the device, interfering with the receipt of signals being received from one or more other devices, Interference from the transmitter to the receiver of a device particularly in the case of a shared transmit and receive antenna or cable, or a transmit and receive antenna in close proximity between the transmitter and receiver which is often the case for antennas on mobile communications devices can create interference problems even when the transmit and receive frequency bands are different.

Attempts at canceling self interference by using one or more electronic circuits and filters implemented as electrical components operating in same frequency range as the signals being received and transmitted, e.g., radio frequency domain, have had limited success.

The generation of an interference cancelation signal using electrical components in the form of filters, etc., e.g., in the radio frequency domain, has several problems associated with it. For one thing the electrical circuit elements used to generate an interference cancelation signal may themselves radiate interference, particularly when dealing with signals in the RF frequency band, as wires and/or other components of a filter implemented as an electrical circuit operate as signal transmitters and receivers. Such additional self interference can be highly undesirable in a communications device which transmits and receives radio signals, e.g., using antennas, or electrical signals, e.g., using a electrical cable interface such as a coax cable, Ethernet cable or other non-optical cable. Another problem with the use of filters that operate in the RF band is that shielding within a small device to prevent the transmission of interference generated by such filters in the small device can be difficult to implement given space constraints.

Electrical filter circuits which may be used to generate an interference cancelation filter also have the disadvantage of being relatively bulky making it difficult to implement a large number of filter taps and/or separate delays in an electrical filter being used to generate an interference cancelation filter. For this reason attempts to generate an interference cancelation signal using electrical components operating in the RF frequency domain are often limited to using filters with very few taps and/or delays. Furthermore attempts to pack large numbers of RF circuits or filter taps in a small space can further complicate the problem of interference from one component leaking to another component via unintended radio frequency interaction between nearby components, e.g., with one component acting as an unintended RF transmitter and another component acting as an unintended RF receiver.

Power issues with splitting an electrical signal are also of concern as is thermal noise with electrical components that may be used to generate an interference cancelation signal using electrical components. If a weak interference signal is to be generated for one or more received signal components or frequencies the thermal noise of the electrical circuits may preclude the generation of a meaningful interference cancelation signal since the thermal noise of the electrical circuits used to generate the interference signal may, in some cases, exceed the expected interference signal to be canceled. Moreover, insertion losses in RF systems with couplers and/or microstrips can be high and should normally be impedance-matched carefully, keeping the resulting capacitance and inductances in mind, making the use of such components increasingly more challenging for higher RF frequencies.

Another problem with implementing filters as electrical circuits in the RF range is that it may be difficult to design or implement electrical circuits with the desired filter characteristics since frequency range of the filters may not be uniform in the desired frequency range that may be required to generate an appropriate interference cancelation signal.

While attempts to determine an appropriate interference cancelation signal in a digital RF domain may be attempted, to generate an accurate analog interference cancelation signal to be combined with a received signal may require digital to analog converters with a very large frequency range and resolution which can be costly and/or difficult to implement.

In view of the above discussion it should be appreciated that there is a need for improved methods and apparatus which can be used for self interference cancelation in which devices communicate using radio frequency signals. In particular it would be desirable if methods and/or apparatus could be developed which address, overcome or reduce one or more of the above discussed problems associated with generating interference cancelation signals using electrical circuits and/or filters operating in the radio frequency domain and/or require the conversion of a digital interference cancelation signal generated in the RF domain to an analog interference cancelation signal using a high resolution electrical digital to analog signal converter.

SUMMARY

Methods and apparatus are described which involve the use of one or more optical circuits, e.g., optical filters, to generate an analog interference cancelation signal which can be combined with a received analog signal as part of a self interference cancelation operation. The methods and apparatus are well suited for use in a wide range of communications devices which communicate in an RF frequency band. In the present application the RF frequency band is to include frequencies from 0 to 500 GHZ. Optical frequencies are above the 500 GHZ frequency.

In one but not necessarily all embodiments an apparatus for performing interference cancelation includes a digital interference cancelation element between a digital transmit element and a receiver element for generating a filter delay control signal and a baseband interference cancelation signal; a combining element in an RF receiver signal path; and an RF cancelation filter positioned between an RF transmit signal path and the combining element in an RF receiver signal path, the combining element receiving at a first input an RF frequency signal generated by the RF cancelation filter from a signal received from the RF signal transmit path which is delayed in accordance with delay control information received from the digital interference cancelation element.

A radio frequency (RF) interference cancelation apparatus includes in some embodiments a transducer that oscillates to produce an acoustic signal which carries an RF signal supplied as an input to said transducer; a control input that receives a control signal used to control signal control phonon-photon transduction of the acoustic signal which carries the RF signal on to an optical signal being communicated through a waveguide; an optical to electrical converter that converts an optical signal that exits the waveguide to an electrical interference cancelation signal; and a combiner for combining said electrical interference cancelation signal with a received RF signal which includes interference.

A method of performing radio frequency (RF) interference cancelation in some but not necessarily all embodiments includes supplying an RF signal to a transducer that oscillates to produce an acoustic signal which carries said RF signal; receiving at a control input a control signal; using the control signal to control phonon-photon transduction of the acoustic signal which carries the RF signal on to an optical signal being communicated through a waveguide; performing an optical to electrical conversion on an optical signal that exits the waveguide to produce an electrical interference cancelation signal; and using said electrical interference cancelation signal in an interference cancelation operation performed on a received RF signal which includes interference.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

Methods and apparatus for performing self interference cancellation on radio frequency or other signals are described. While the signals which are transmitted and received are radio frequency signals in at least some embodiments, radio frequency to optical frequency conversion and optical signal processing is used in some embodiments to facilitate generation of a radio frequency signal interference cancelation signal. The use of optical filters allows for a wide range of frequencies to be supported as part of generating the interference cancelation signal with an optical signal being converted to an analog RF signal without the need for generation of a digital RF version of the interference cancelation signal in at least some but not necessarily all embodiments.

To enable simultaneous transmission and reception in a full duplex wireless radio it can be important to isolate transmit and receive chains in-order to prevent high-power transmit signals from interfering (e.g., via leakage or reflection) with low-power signal at the receiver. For efficient full-duplex transceivers the capability to cancel self-interference from the received signal can be important. For the same signal-to-noise ratio found in state-of-the-art simplex transceivers, the magnitude of this self-interference may need to be as high as 110 dB for a Wide Area Network Application. In principle, the knowledge of the transmit signal at the transceiver permits cancellation of self-interference and reconstruction of the received signal, provided that the cancellation scheme can adapt to the time variation of the self-interference without substantially elevating the noise floor of the receiver. A challenge here is to accurately reconstruct the received self-interference signal so that it to be subtracted from the received signal.

Figure 1:
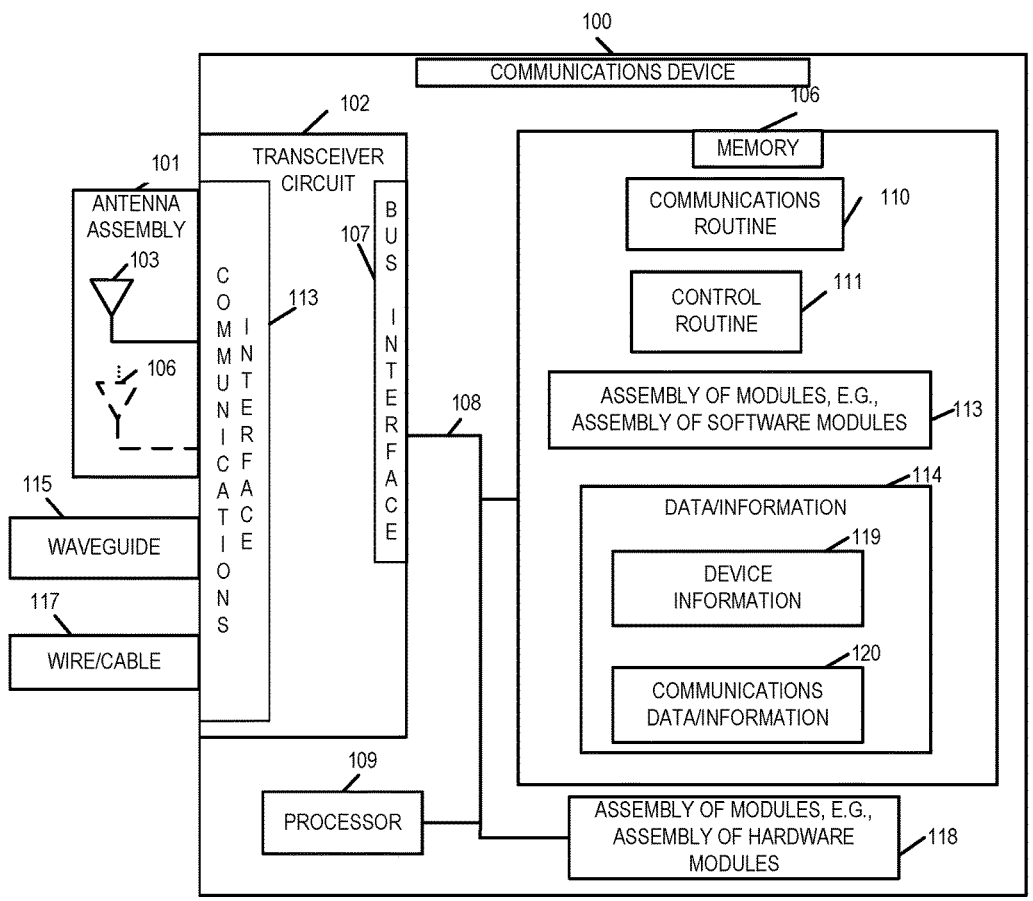
FIG. 1 is a drawing of an exemplary communications device including self-interference cancellation capability, in accordance with an exemplary embodiment.

FIG. 1 is a drawing of an exemplary communications device 100 including self-interference cancellation capability in accordance with an exemplary embodiment. Exemplary communications device 100 includes a transceiver circuit 102, a processor 109, e.g., a CPU, a memory 106, and an assembly of modules 118, e.g., assembly of hardware modules, e.g., circuits, coupled together via a bus 108, over which the various elements 102, 109, 106, 118, may communicate data and information. Memory 106 includes a communications routine 110 configured to control communications operations for the communications device 100 including controlling operation of the transceiver circuit 102, a control routine 111, an assembly of modules 113, e.g., an assembly of software modules, and data/information 114. Data/information 114 includes device information 119, which includes. e.g., interface information including optical filter component information and antenna information, etc., and communications data/information 120 which includes, e.g., RF frequency information, channel type information, channel conditions, determined filter coefficients, received signal information, transmitted signal information, generated radio frequency interference cancellation signal information, etc. In some embodiments, some information stored in memory 106 is also stored in local memory within transceiver circuit 102. In some embodiments, processor 109, e.g., a CPU, executes routines including software modules included in memory 106 to control the communications device 100 to implement a method in accordance with the present invention, e.g., control the transceiver circuit 102 to implement a radio frequency interference cancellation method which includes the use of an optical filter assembly. In some embodiments, one or more of steps of the exemplary method are implemented alternatively by one or more hardware modules, e.g., circuits, included in assembly of modules 118.

Transceiver circuit 102 includes a bus interface 107 and a communications interface 113. Bus interface 107 couples the transceiver circuit to bus 108. Communications interface 113 couples the transceiver circuit 102 to one or more or all of: an antenna assembly 101, a waveguide 115 and a wire/cable 117. In some embodiments, the antenna assembly 101 is included as part of the communications device 100. Antenna assembly 101 includes one or more antennas (103, . . . , 106). In some embodiments, antenna assembly 101 includes a single antenna 103 which is used by both the transmitter and receiver of the transceiver circuit 102. In some embodiments, the antenna assembly 101 includes a transmit antenna 103 and a receive antenna 106. In some embodiments, the antenna assembly 101 includes a plurality of transmit antennas and a plurality of receive antennas. In some such embodiments, the antenna assembly 101 and the transceiver circuit 102 support MIMO operations.

Figure 2A:
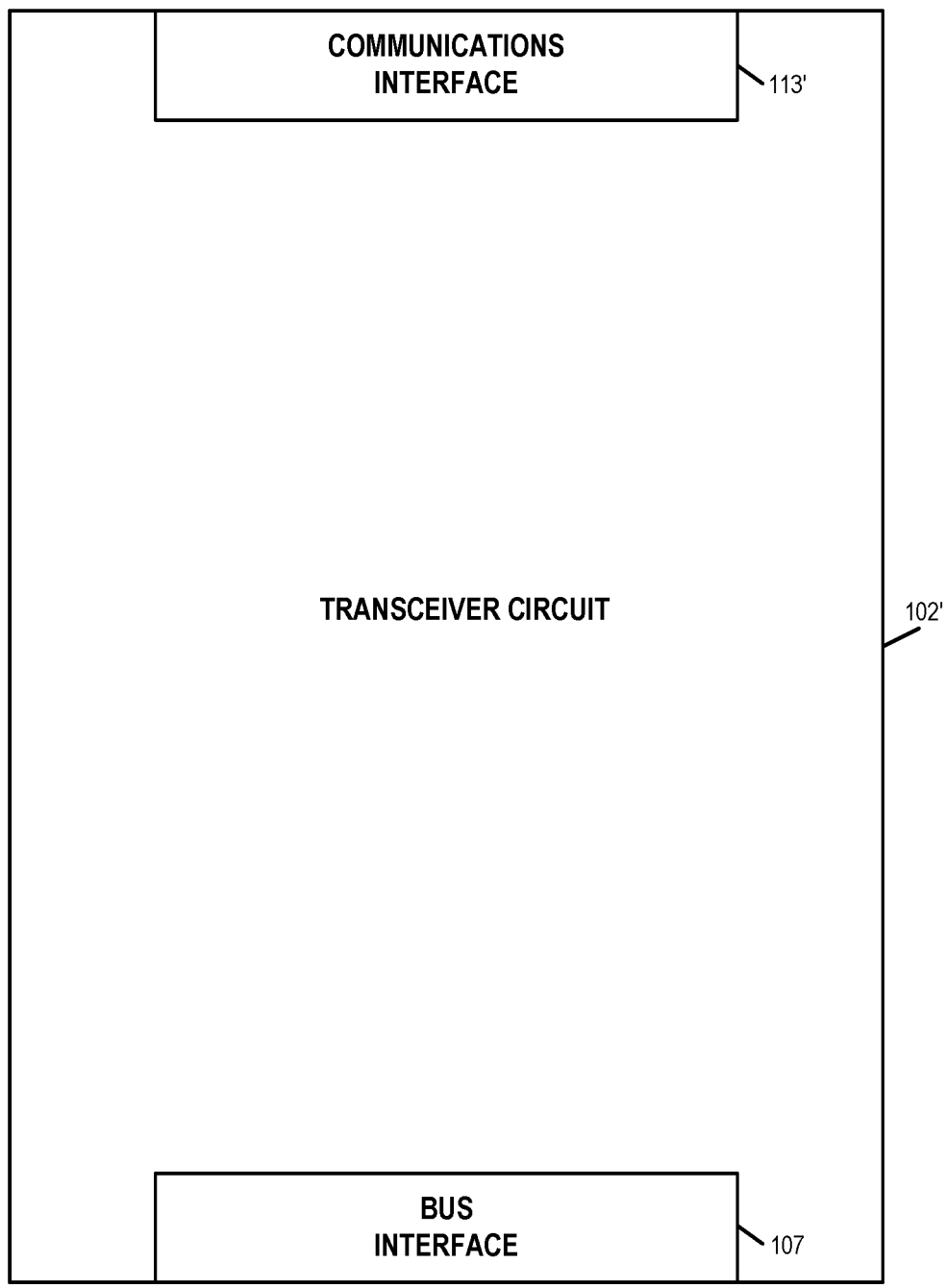
FIG. 2A is a drawing of an exemplary transceiver circuit which may be included in the communications device of FIG. 1, in accordance with an exemplary embodiment.

FIG. 2A illustrates an exemplary transceiver circuit 102' in accordance with an exemplary embodiment. Transceiver circuit 102' includes communications interface 113' and bus interface 107. In some embodiments, transceiver circuit 102' is transceiver circuit 102 of FIG. 1, and communications interface 113' is communications interface 113 of FIG. 1.

Figure 2B:
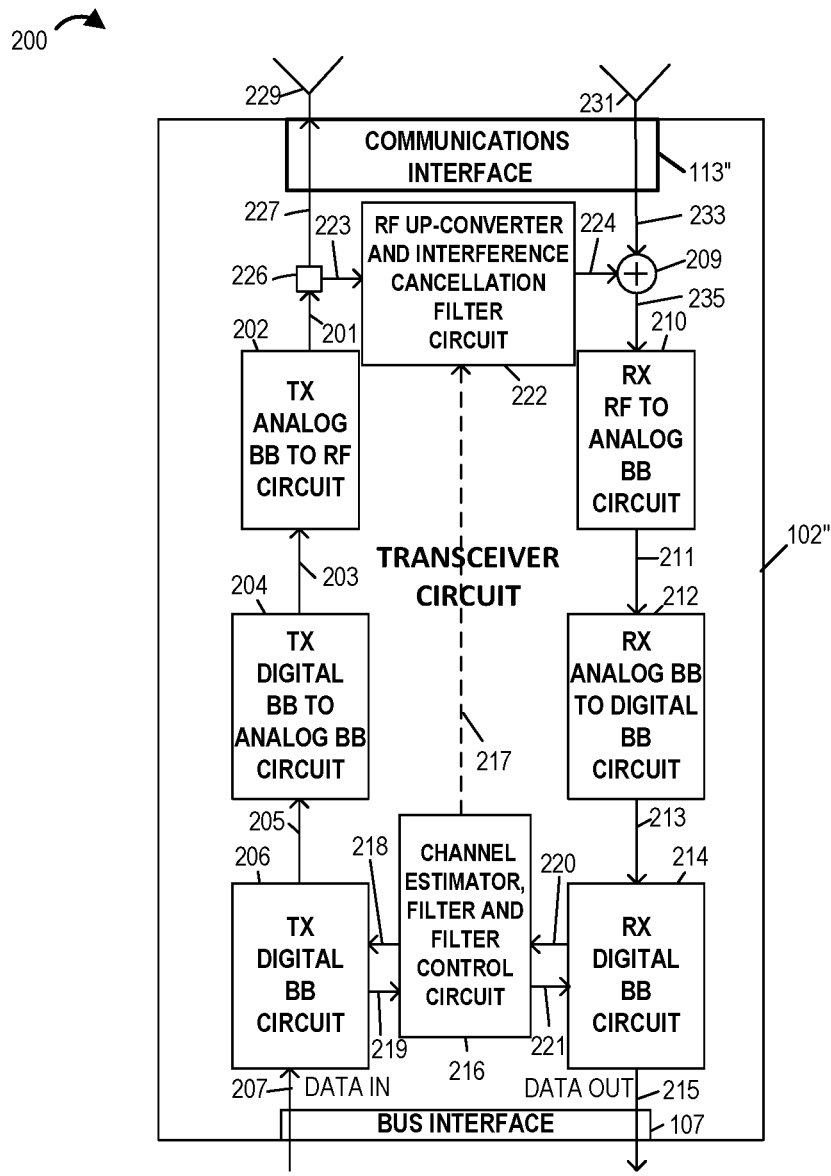
FIG. 2B is a drawing of an exemplary transceiver circuit which includes a communications interface which couples a transmit chain of the transceiver circuit to a transmit antenna and couples a receive chain of the transceiver circuit to a transmit antenna, in accordance with an exemplary embodiment.
Figure 2C:
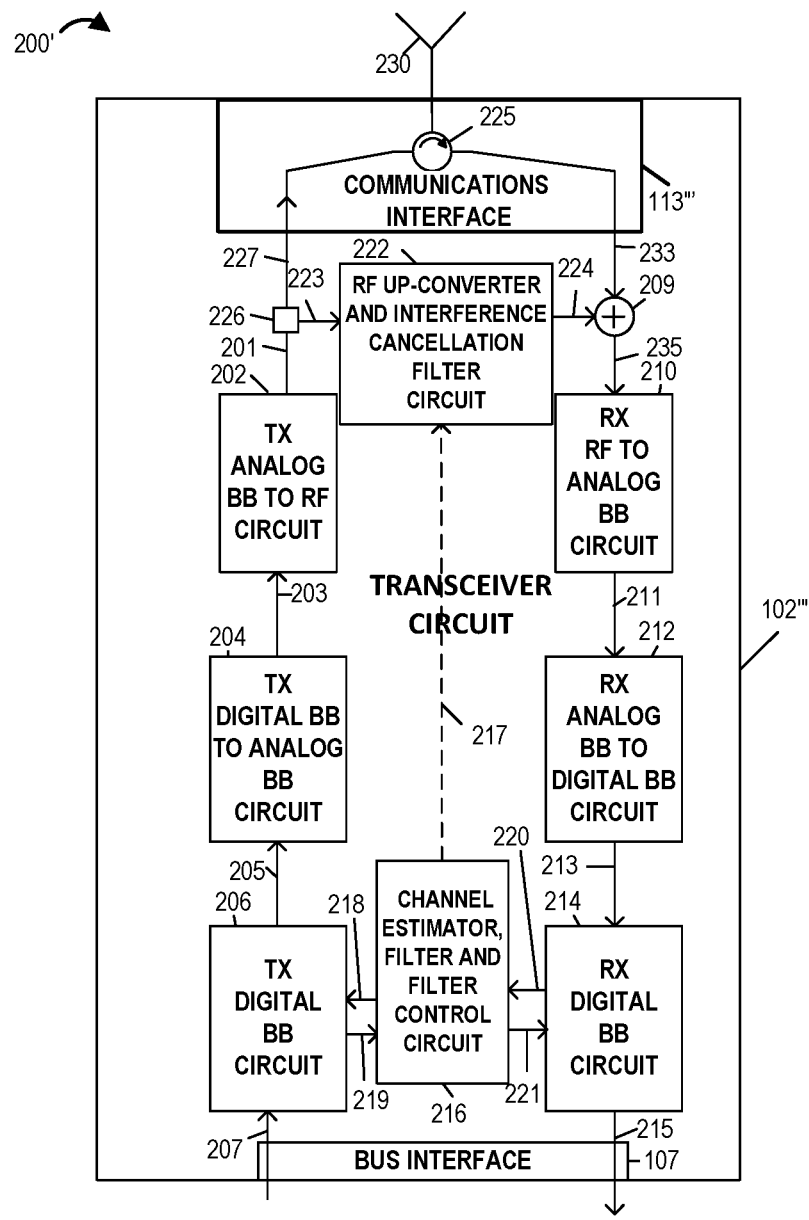
FIG. 2C is a drawing of an exemplary transceiver circuit which includes a communications interface which couples a transmit chain of the transceiver circuit and a receive chain of the transceiver circuit to single antenna, via a circulator included in the interface, in accordance with an exemplary embodiment.

FIG. 2B and FIG. 2C illustrate two exemplary variants of a wireless transceiver architecture that includes one transmit chain and one receiver chain. The realization shown in drawing 200 of FIG. 2B illustrates a two antenna approach where the transmitter chain and the receiver chain use separate antennas 229, 231, respectively. The coupling between transmit and receive is driven by the distance between the antennas, the antenna type and size. In case of the realization shown in drawing 200' in FIG. 2C, the transmit chain and the receive chain use a single antenna 230. The antenna 230 is coupled to the transmit and receive chains using a circulator 225 where the circulator provides some degree of isolation between the transmit signal 227 and receive signal 233. The high power self-interference seen at the receive chain is driven by the isolation provided by the circulator 225 and the reflection from the antenna 230 that leaks back in to the receive chain.

Drawing 200 of FIG. 2B illustrates an exemplary transceiver circuit 102" in accordance with an exemplary embodiment. Transceiver circuit 102" is, e.g., transceiver circuit 102 of FIG. 1 and/or transceiver circuit 102' of FIG. 2. Transceiver circuit 102" includes communications interface 113", bus interface 107, transmit (TX) digital baseband (BB) circuit 206, TX digital BB to analog BB circuit 204, TX analog BB to radio frequency (RF) circuit 202, coupler device 226, signal combiner/coupler device 209, RX RF to analog BB circuit 210, RX analog BB to digital BB circuit 212, RX digital BB circuit 214, RF up-converter and interference cancellation filter circuit 222, and channel estimator, filter, e.g., digital filter, and filter control circuit 216, coupled together as shown in FIG. 2B. Signal combiner 209 is configured to combine a received radio frequency signal 233 with the radio frequency interference cancellation signal 224 to produce a recovered radio frequency signal 235. In various embodiments, the signal combiner 209 is configured to add the radio frequency interference cancellation signal 234 to the received radio frequency signal 233 to generate the recovered radio frequency signal 235.

A high level overview of the transceiver circuit 102" of FIG. 2B will now be described. The transceiver circuit 102" comprises of a transmit chain and the receive chain. In the transmit chain, the transmit digital baseband circuit 206 receives, via bus interface 107, input data 207 to be transmitted in the form of bits, converts the bits into a digital baseband waveform 205, which is output to the TX digital BB to analog BB circuit 204. The TX digital baseband circuit 206 performs encoding and modulation of the received input data 207. The encoding and modulation performed by TX digital baseband circuit 206 uses, e.g., orthogonal frequency division multiplexing, CDMA, or another encoding and modulation scheme. The TX digital BB to analog BB circuit 204, e.g., a filter and digital to analog converter (DAC) assembly, converts the digital signal 205 into analog baseband signal 203, which is output to TX analog BB to RF circuit 202.

Analog baseband signal 203 is received by TX analog BB to RF circuit 202 and subsequently upconverted to the operating RF frequency using a direct conversion or an intermediate frequency converter included in circuit 202. The up-converted RF signal 201 is the output of a power amplifier included in circuit 202. The up-converted RF signal 201 is coupled or divided using a device 226 where the pass-through signal 227 goes to the communication interface 113" and the tapped signal 223 is fed to the RF up-converter and interference cancellation filter circuit 222.

The RF signal 227 in the communication interface 113" passes through to the antenna 229 in case of this realization. Receive antenna 231 receives a wireless RF signal and outputs received signal 233 into in to interface 113" toward the receive chain. On the receive side of the transceiver circuit 102", the receive signal 233 from the communication interface 113" feeds in to a coupler or combiner 209 which is 3 port device. Coupler or combiner 209 is responsible for combining input signal 224, which is an output of the RF-up converter and interference cancellation filter circuit 222, and input signal 233, which is the signal received via receive antenna 231, to generate output RF signal 235. The output RF signal 235 is fed into the RX RF to analog BB circuit, 210, which is an RF down-converter, that down-converts the RF signal 235 into a baseband analog signal 211. This baseband analog signal 211 is received, filtered and sampled by RX analog BB to digital BB circuit 212, which generates and outputs sampled output signal 213. The sampled output signal 213 is fed into the RX digital BB circuit 214 including a digital receive processor that is responsible for demodulation and decoding.

RF Signal 223, a copy of the transmit signal 201 is fed into the RF up-converter and interference cancellation filter circuit 222. The RF Up-converter and interference cancellation filter circuit 222 produces signal 224 which is a negative copy or near negative copy of the interference signal received as a component of receive signal 233, said interference signal being an effect of transmission of signal 227. The combining of the negative copy 224 with the received signal 233 using a combiner/coupler device 209 results in cancellation of interference that is caused by the transmitter of transceiver circuit 102" at the receiver of transceiver circuit 102".

Channel estimator, filter and filter control circuit 216 interfaces with the digital processing block of transmit digital baseband circuit 206 and with the digital processing block of receive digital baseband circuit 214. The channel estimator, filter, and filter control circuit 216 is responsible for reconstruction of the residual interference signal that is observed at the sampled signal 220 in the RX digital baseband circuit 214. The channel estimator, filter and filter control circuit 216 is responsible for the measurement and training of a digital filter included in circuit 216 and the RF cancellation filter included in circuit 222. Channel estimator, filter, and filter control circuit 216 uses input signal 219, a copy of the digital transmit signal, and received sampled signal 220 to determine the effect of the transceiver circuit 102" and antennas (229, 231), determine the channel that causes interference, and determine the appropriate coefficients to be programmed to the RF interference cancellation filter included in circuit 222. The determined appropriate coefficients are communicated in signal 217 from channel estimator, filter and filter control circuit 216 to RF up-converter and interference cancellation filter circuit 222. Channel estimator, filter and filter control circuit 216 also recreates a negative copy 221 of the interference signal, which it sends to RX digital BB circuit 214 to be subtracted from the received signal 213. RX digital BB circuit 214 receives the recreated negative copy 221 of the interference signal and subtracts the recreated negative copy 221 of the interference signal from received signal 213, as part of its processing. Circuit 214 further generates digital data out signal 215 and outputs digital data out signal via interface 107. Drawing 200' of FIG. 2C illustrates exemplary transceiver circuit 102''' which implements a transceiver architecture where the communications interface 113''' includes a 3-port circulator device 225. The circulator 225 is responsible for the creation of isolation between the ports in one direction. This created isolation prevents the transmit RF signal 227 leaking to the receive RF signal 233. The circulator based design facilitates simultaneous transmission and reception using a single antenna 230.

Drawing 200' of FIG. 2C illustrates exemplary transceiver circuit 102''' in accordance with an exemplary embodiment. Transceiver circuit 102''' is, e.g., transceiver circuit 102 of FIG. 1 and/or transceiver circuit 102' of FIG. 2. Transceiver circuit 102''' includes communications interface 113''' which includes circulator 225, bus interface 107, transmit (TX) digital baseband (BB) circuit 206, TX digital BB to analog BB circuit 204, TX analog BB to radio frequency (RF) circuit 202, coupler device 226, combiner/coupler device 209, RX RF to analog BB circuit 210, RX analog BB to digital BB circuit 212, RX digital BB circuit 214, RF up-converter and interference cancellation filter circuit 222, and channel estimator, filter, e.g., digital filter, and filter control circuit 216, coupled together as shown in FIG. 2C. Signal combiner 209 is for combining a received radio frequency signal 233 with the radio frequency interference cancellation signal 224 to produce a recovered radio frequency signal 235. In various embodiments, the signal combiner 209 is configured to add the radio frequency interference cancellation signal 224 to the received radio frequency signal 233 to generate the recovered radio frequency signal 235.

A high level overview of the transceiver circuit 102''' of FIG. 2C will now be described. The transceiver circuit 102''' comprises a transmit chain and the receive chain. In the transmit chain, the transmit digital baseband circuit 206 receives, via bus interface 107, input data 207 to be transmitted in the form of bits, converts the bits into a digital baseband waveform 205, which is output to the TX digital BB to analog BB circuit 204. The TX digital baseband circuit 206 performs encoding and modulation of the received input data 207. The encoding and modulation performed by TX digital baseband circuit 206 uses, e.g. orthogonal frequency division multiplexing, CDMA, or another encoding and modulation scheme. The TX digital BB to analog BB circuit 204, e.g., a filter and digital to analog converter (DAC), converts the digital signal 205 into analog baseband signal 203, which is output to the transmit analog baseband to RF (TX analog BB to RF) circuit 202. Analog baseband signal 203 is received by the TX analog BB to RF circuit 202 and subsequently up-converted to the operating RF frequency using a direct conversion or an intermediate frequency converter included in circuit 202. The up-converted RF signal 201 is the output of a power amplifier included in circuit 202. The up-converted RF signal 201 is coupled or divided using a device 226 where the pass-through signal 227 goes to the communication interface 113''' and the tapped signal 223 is fed to the RF up-converter and interference cancellation filter circuit 222. The RF signal 227 in the communication interface 113''' passes through circulator 225 to the antenna 230 in case of this realization.

Antenna 230 receives a wireless RF signal and outputs received signal into circulator 225 of interface 113''', which sends the received signal 233 toward the receive chain. On the receive side of the transceiver circuit 102''', the receive signal 233 from the communication interface 113''' feeds into a coupler or combiner 209 which is 3 port device. Coupler or combiner 209 is responsible for combining input signal 224, which is an output of the RF-up converter and interference cancellation filter circuit 222, and input signal 233, which is the signal received via antenna 230, to generate output RF signal 235. The output RF signal 235 is fed into the RX RF to analog BB circuit 210, which is an RF down-converter, that down-converts the RF signal 235 into a baseband analog signal 211. This baseband analog signal 211 is received, filtered and sampled by RX analog BB to digital BB circuit 212, which generates and outputs sampled output signal 213. The sampled output signal 213 is fed into the RX digital BB circuit 214 including a digital receive processor that is responsible for demodulation and decoding.

RF Signal 223, a copy of the transmit signal 201 is fed into the RF up-converter and interference cancellation filter circuit 222. RF Up-converter and interference cancellation filter circuit 222 produces signal 224 which is a negative copy or near negative copy of the interference signal received as a component of receive signal 233, said interference signal being an effect of transmission of signal 227. The combining of the negative copy 224 with the received signal 233 using a combiner/coupler device 209 results in cancellation of interference that is caused by the transmitter of transceiver circuit 102''' at the receiver of transceiver circuit 102'''.

Channel estimator, filter and filter control circuit 216 interfaces with the digital processing block of transmit digital baseband circuit 206 and with the digital processing block of receive digital baseband circuit 214. The channel estimator, filter, and filter control circuit 216 is responsible for reconstruction of the residual interference signal that is observed at the sampled signal 220 in the RX digital baseband circuit 214. The channel estimator, filter and filter control circuit 216 is responsible for the measurement and training of a digital filter included circuit 216 and the RF cancellation filter included in circuit 222. Channel estimator, filter, and filter control circuit 216 uses input signal 219, a copy of the digital transmit signal, and received sampled signal 220 to determine the effect of the transceiver circuit 102''' and antenna 230, determine the channel that causes interference, and determine the appropriate coefficients to be programmed to the RF interference cancellation filter included in circuit 222. The determined appropriate coefficients are communicated in signal 217 from channel estimator, filter and filter control circuit 216 to RF up-converter and interference cancellation filter circuit 222. Channel estimator, filter and filter control circuit 216 also recreates a negative copy 221 of the interference signal, which it sends to RX digital BB circuit 214 to be subtracted from the received signal 213. RX digital BB circuit 214 receives the recreated negative copy 221 of the interference signal and subtracts the recreated negative copy 221 of the interference signal from received signal 214, as part of its processing. Circuit 214 further generates digital data out signal 215 and outputs digital data out signal via interface 107.

Drawing 200' of FIG. 2C illustrates exemplary transceiver circuit 102''' which implements a transceiver architecture where the communications interface 113''' includes a 3-port circulator device 225. The circulator 225 is responsible for the creation of isolation between the ports in one direction. This created isolation prevents the transmit RF signal 227 leaking to the receive RF signal 233. The circulator based design facilitates simultaneous transmission and reception using a single antenna 230.

Figure 2D:
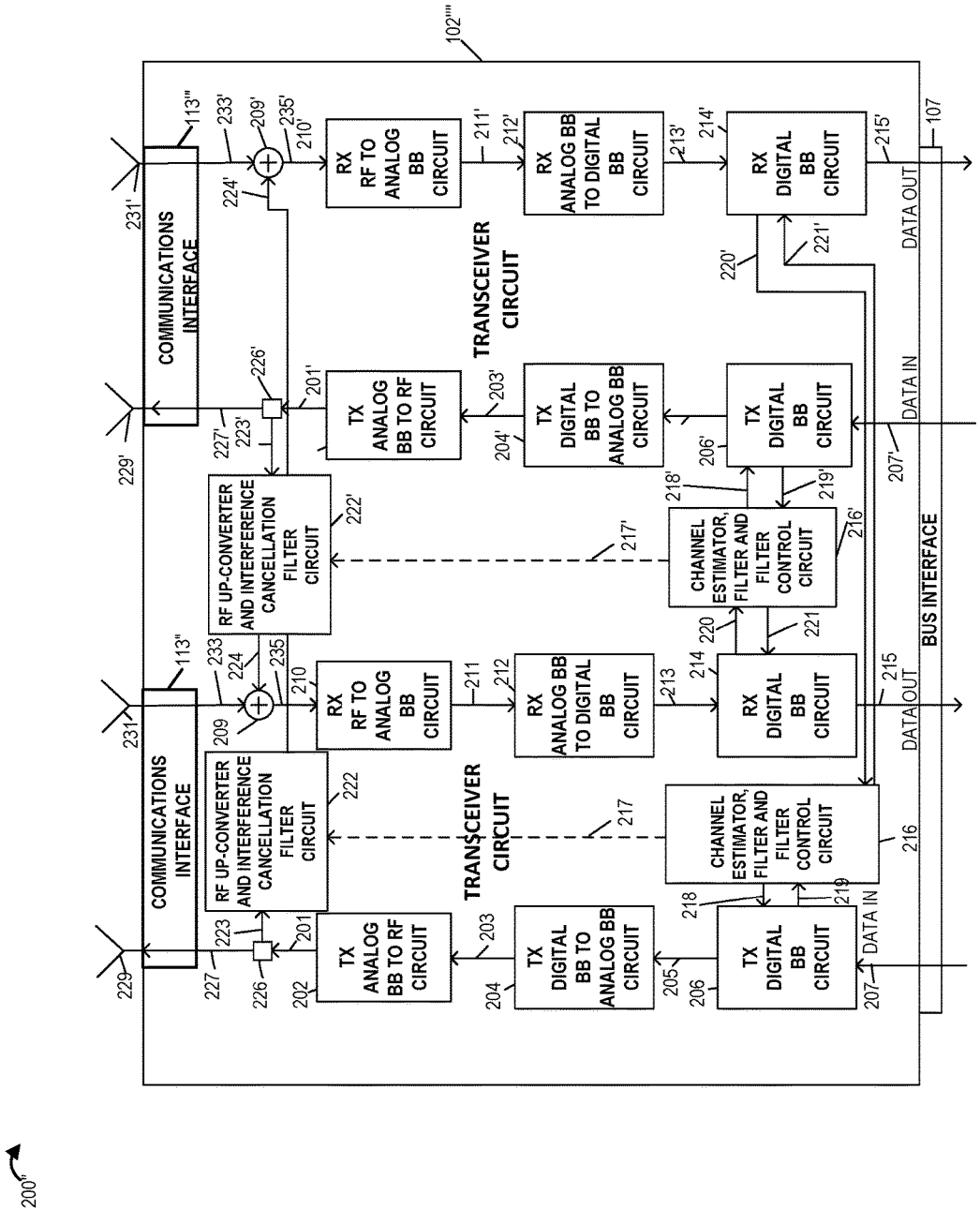
FIG. 2D is a diagram showing a first exemplary multi chain, e.g., dual chain, radio device.
Figure 2E:
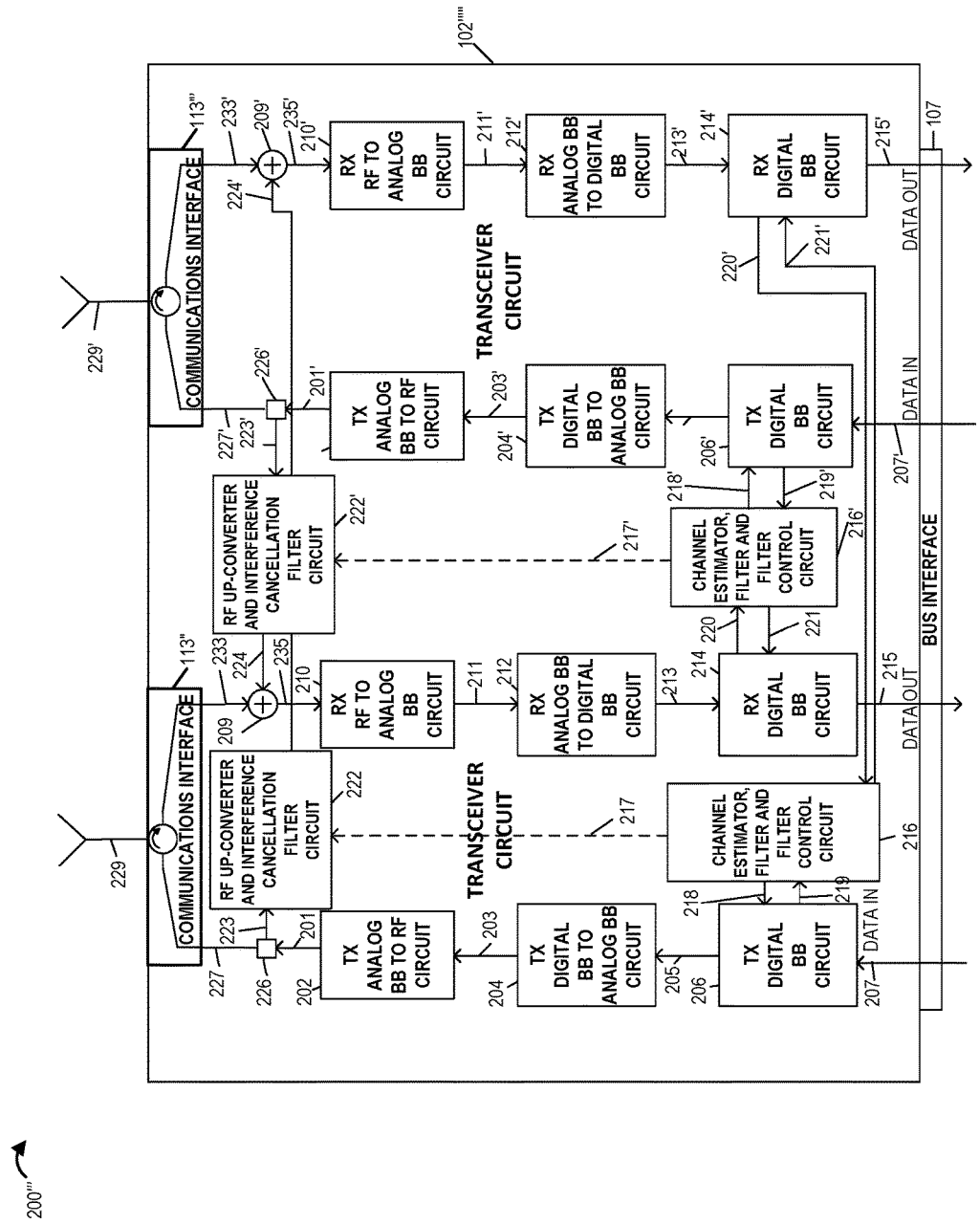
FIG. 2E is a diagram showing a second exemplary multi chain, e.g., dual chain, radio device.

FIG. 2D and FIG. 2E diagrams 200'' and 200''' show exemplary dual/multi chain radios. A high level overview of the 102'''' will be described below. The diagram 200''' in FIG. 2D shows two transmit chains and two receive chains connected to the communication interface 113'' and 113''''. The transmit antenna 229 is radiating a signal 227 at the frequency A while the receive antenna 231 is receiving the signal 233 at frequency B. On the communication interface 113''', the transmit antenna 229' is radiating the signal 227' at the frequency B while the receive antenna 231' is receiving signal 233' at the frequency A. In this configuration, the signal 227 from antenna 229 causes interference at the antenna 231', while the signal 227' radiated from antenna 229' interferes at the receiver 231. The configuration shown here can be understood as a case of two frequency division duplex operation capable radios operating together where one radio transmits at frequency A and receives at frequency B while the other radio transmits at frequency B while receiving at frequency A. The copy signal 223 of the transmit signal 227 going to antenna 229 feeds to the RF upconverter and interference cancelation circuit 222 which processes and shapes the signal to reflect the interference signal characteristic seen at the receive antenna 231' as signal 233'. The reconstructed signal 224', e.g., an interference cancellation signal, which is an approximate negative copy of the interference signal is added to the received signal 233' at 209'. The channel estimator, filter and filter control circuit 216 interfaces with the TX digital baseband circuit 206, sending digital transmit signal 218 to the TX digital baseband circuit 206 and receiving signal 219 from the TX Digital BB Circuit 206. The channel estimator, filter and filter control circuit 216 also interfaces with the TX digital baseband circuit 214', receiving the digital signal 220' from RX digital BB circuit 214' and sending signal 221' to the RX digital BB circuit 214'. The filter control circuit 216 provides the coefficients 217 to the RF up-converter and interference cancelation filter circuit 222. The copy signal 223' of the transmit signal 227' going to transmit antenna 229' feeds to the RF upconverter and interference cancelation filter circuit 222' that processes signal 223' to create the reconstructed signal 224. The output signal 224 from the RF upconverter and interference cancelation filter 222' is added to the receive signal 233 that contains the interference. FIG. 2E diagram 200''' shows an arrangement of various blocks in 102''' similar to that of 102''' in FIG. 2D with one distinction that the communication interface connects the transmit and receive chain to a single antenna on each side.

As shown in FIG. 2B-2C, the blocks 222 and 216 are elements, e.g., two stages, of interference reconstruction where the main function of these two structures is to delay/buffer a copy of the transmit signal 223 and filter it such that its output 224 represents an accurate reconstruction of the self-interference signal 233 that can be combined using 209 with a received signal 233 in the receiver chain. Each filter 216, 222 may generate different portions of the received signal to be used cancel different portions of the interference. The different portions may correspond to self-interference corresponding to different amounts of signal delay. The ability to accurately delay the signal corresponding to many or all received copies due to reflections from objects in the environment can be useful when performing interference cancelation. In accordance with one aspect of the invention various approaches in RF, surface acoustic wave, photonic, phonon-photonic, slow light and RF MEMS based switches are used in novel configurations and unique manner to present a unique architecture where a combination of one or more of these techniques can be used to achieve the degree of self-interference cancellation desirable for a full duplex operation. The use of surface acoustic wave and photonic techniques to generate delayed versions of a signal may be useful for supporting delays of durations which might be otherwise difficult to support.

RF Photonics Solution

Various features use RF photonics in generating a delayed version of a signal. RF photonics may, and sometimes does, involve a hybrid approach that involves processing RF signals at optical domains. In at least some RF photonic systems, analog RF signal defines the envelope of an optical carrier wave, typically around 200 THz. Therefore, even multi-GHz ultra-wideband signals occupy a fractional bandwidth of less than 10-5. Similarly, millimeter-wave baseband frequencies are far smaller than the typical bandwidth of optical components. Therefore, RF photonics is a powerful approach that is transparent to the RF baseband frequency, provided that a broadband modulator is used. Space-wise, optical delay lines in the form of optical fibers can be coiled into centimeter loops, and multiple delay lines can be stacked together vertically, and packed into a footprint that is 4 to 5 times smaller than microwave delay lines for a 12-tap cancellation filter. Unlike the microwave filter, increasing the tap number from 12 to 64 in a RF-photonic filter only increases the height of the system, and allows for much better analog cancellation without increasing system footprint. Another important feature of a RF photonic link is its fundamentally unidirectional nature, i.e. the signal path is fixed from the optical modulator (RF-to-optics) towards the optical detector (optics-to-RF), since neither device operates in a reversible fashion. Besides these technical advantages, an RF-photonic approach has also benefited economically from the tremendous progress with investments in long-haul telecommunication industry, in terms of performance improvement and cost reduction. Besides addressing the challenges directly related to full-duplex transceiver, RF photonic systems also enjoy several additional advantages unique to its hybrid architecture. First, at high power, a laser source provides an overall gain to the RF transfer function, which can be adjusted on demand. Secondly, using coherent RF photonic systems, full complex-valued filter coefficients can be realized by adjusting the optical phase, which only requires sub-micron displacement and can be realized with time constants less than 1 micro second. More recently, on-chip optical signal processing has been realized via opto-mechanical, also sometimes referred to as optomechanical, effects: an mm scale chip can provide the same processing power which previously required 100 meters of optical fibers.

Metrics and features of the present invention and the proposed approach does well include:

Delay bandwidth: the optical bandwidth over which a certain delay can be achieved;
Maximum delay: the maximum achievable delay value;
Fractional delay: the absolute delay value divided by the pulse width or bit time. This is important to the delay/storage capacity;
Delay range: the tuning range that the delay can be achieved (from minimum value to maximum achievable value);
Delay resolution: the minimum incremental delay tuning step;
Delay accuracy: the precision percentage of the actual delay to that of the desired delay value;
Delay reconfiguration time: the amount of time it takes to switch a delay from one state to another steady state;
Loss over delay: The amount of loss incurred per unit delay. Lower loss per unit delay is desired.

In some embodiments Silicon nitrate is used for a modulator that can transform the RF signal using a piezo structure to convert the RF signal to the optical domain. This modulator will be able to delay the signal based on the change of heaters/reception area/wavelength of the acoustic receptors for absorption of phonons into the optical waveguide.

Self-Interference Cancellation in RF Domain

Figure 4:
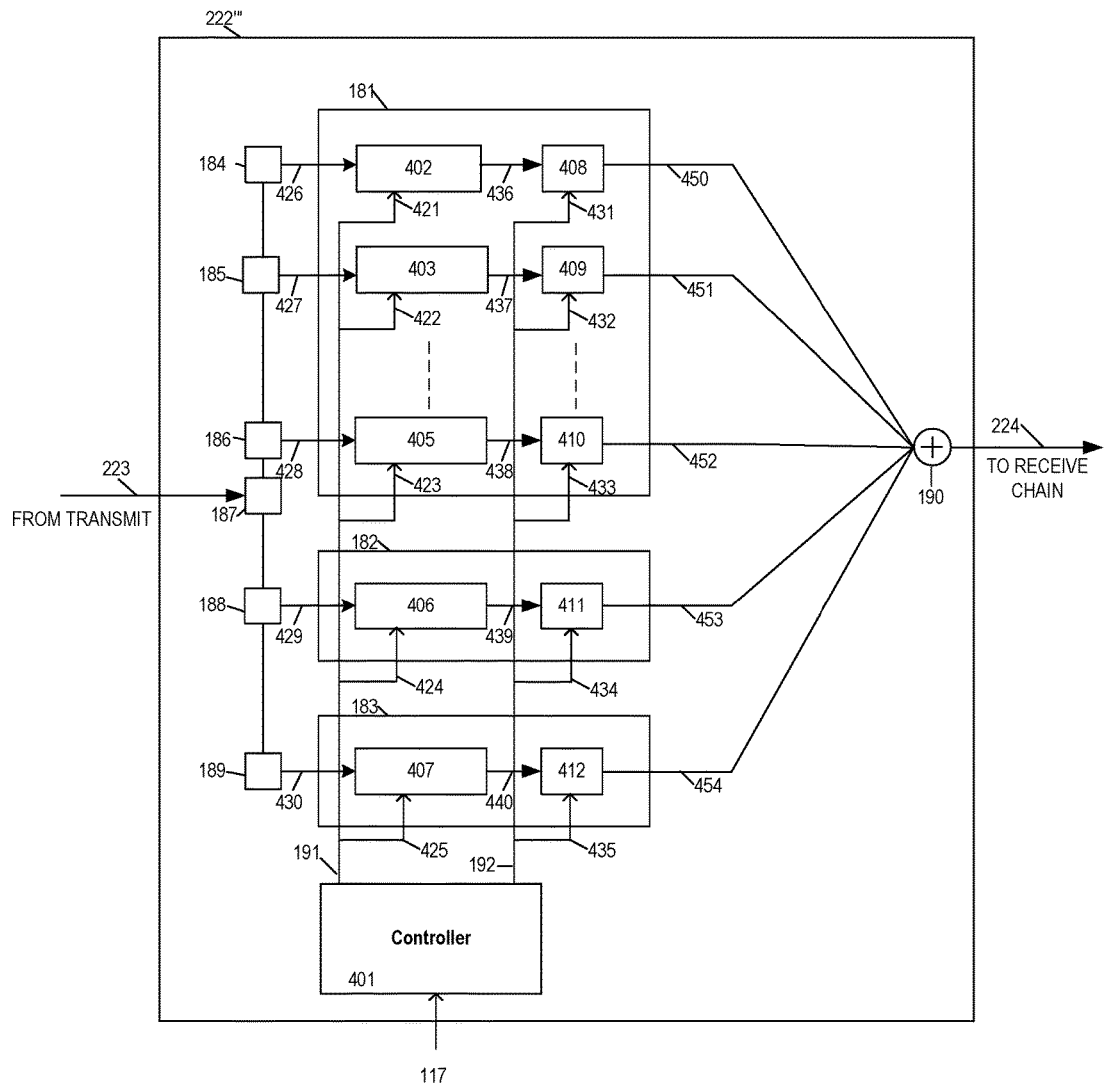
FIG. 4 is a diagram of an exemplary up-conversion and cancellation filter, for self-interference cancellation that can be used as the RF up-converter and interference cancelation filter circuit of the transceiver circuits shown in FIGS. 2B and 2C and various other Figures of the present application.

FIG. 4 describes a high level architecture of the block 122, i.e., the up-conversion and cancellation filter, for self-interference cancellation. The blocks 181, 182 and 183 are exemplary filter banks implemented in accordance with the invention. The bank 183 reconstructs the direct path, bank 182 reconstructs the antenna path and bank 181 reconstructs the scatter path.

An exemplary apparatus for up conversion or down conversion of RF signal for signal processing may, in some but not necessarily all embodiments, have one or more of the following features and/or is configured to in the following exemplary manner:

uses a modulator to up convert the signal the above modulator can be fed with a light source such as laser/LED;
uses a directly modulated laser;
the RF signal can be applied to a piezo-structure that converts the RF signal to acoustic signal this piezo structure then transfers the RF signal over to an optical carrier fed in by a light source.

The apparatus may include elements that delay photonics signals. The elements may, and in some embodiments do, include photon-phonon hybrid device that delays the signal using the speed of acoustic waves. These elements may or may not be tunable for the amount of delay they provide the apparatus may have n-dimensional array of these delay elements the array can be configured to provide the required delay by switching on/off the delay elements or, if capable, configuring each delay elements to achieve a total delay for the desired value.

The apparatus in some embodiments is configured to do one or more of the following:

operate on a wavelength division multiplexing laser and each wavelength is uniquely fed to an array of delay elements;
the delayed optical signal is combined before the detector using an optical combiner, or each of the delayed signal in an array is fed through optical detector where RF signals from each branch is combined using transmission lines;
Division of the cancellation delay element in two, three or more stages;
Support Micro seconds of delay using a mm size architecture;
Support a Slow light architecture;
can use RF MEMS based switches;
Switch-based banks;
Feedback to RF-photonics and MEMS switches (Flowchart diagram)
A Calibration algorithm is supported in some embodiments
Digital cancellation and Interface with digital cancellation can be supported The level of interference cancellation required varies for different wireless deployment applications. In case of a Bluetooth-like transmission with transmit power around 3 dBm and typical noise floor at around −95 dBm, about 98 dB of interference cancellation is required for simultaneous transmit and receive operation. The limit of digital cancellation in such a case is about 42 dB due to the limitation of dynamic range of the type of analog-to-digital converters used in these systems. Three other scenarios for mobile transmission, small cell transmission and base station transmission where the typical transmit power is 23 dBm, 24 dBm and 46 dBm respectively. In these cases also, the digital cancellation is limited by the dynamic range of the analog to digital converters used. Thus, the remaining interference needs to be cancelled in the analog/RF domain.

FIG. 2D describes the operation of a multiple antenna radio capable of simultaneous transmission and reception. It depicts the applicability of the self-interference cancellation architecture with filters 222 and 216 that allows for interference cancellation between multiple transmit antenna to multiple receive antenna. Such a radio requires multiple instantiation of filters 222 and 216 to reconstruct and cancel interference caused by multiple transmit and receive antenna. These multiple instantiations can be, and in some embodiments are, optimized and packaged together as one instantiation with inputs from multiple transmit radios to multiple receive radios. This depiction shows 2 transmit and 2 receive antenna. However, the principle applies to plurality of transmit and receive antenna.

Figure 3A:
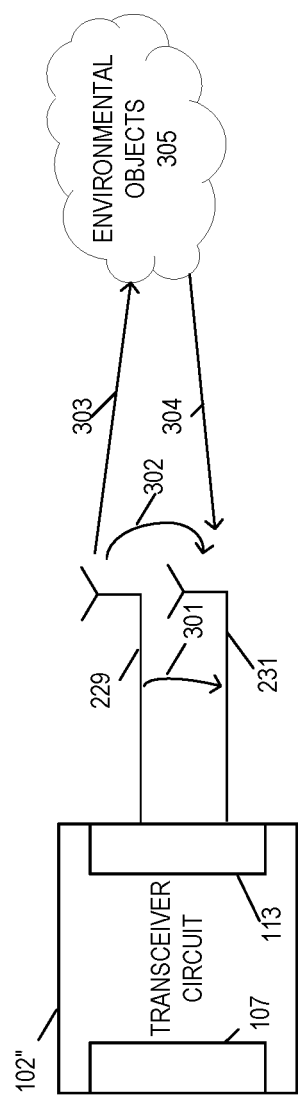
FIG. 3A is a diagram of a wireless device in an environment and is intended to facilitate an understanding of the problem of self-interference in wireless radio system with a device such as the one shown in FIG. 2B capable of simultaneous transmission and reception via separate receive and transmit antennas.

FIG. 3A is a diagram of a wireless device in an environment and is intended to facilitate an understanding of the problem of self-interference in wireless radio systems capable of simultaneous transmission and reception using a transceiver such as the one shown in FIG. 2B where transmission and reception are via separate receive and transmit antennas 229, 231, respectively. In the case of single antenna and dual antenna architectures, we characterize the self-interference caused by the transmitter to the receiver into three categories based on the arrival time of the interference at the receiver.

Direct Path, depicted by 301 in FIG. 3A, where the transmission signal couples with the receiver at either on the circuit board due to radiation across transmission lines or through the circulator as shown in case of a single antenna architecture. This direct path signal is roughly about 15-25 dB lower than the transmit power radiating out of the transmit antenna. This path is also the shortest path of interference from transmit to the receive chain with the delay between 229 and 231 expected to be in the order of 10 s of Pico seconds to 100 s of Pico seconds depending on the architecture of a radio. This direct path is a time varying frequency selective channel where these characteristics depend on the PVT characteristic of operation. (Pressure, Volume (doping and size of the transmission lines), Temperature.)

Figure 3B:
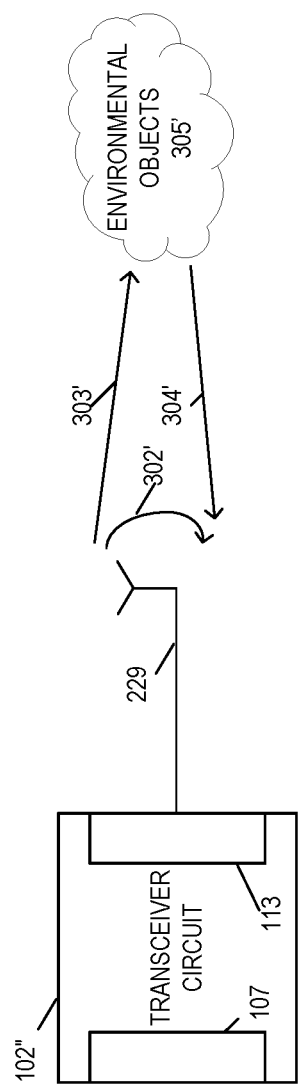
FIG. 3B is a diagram of a wireless device in an environment and is intended to facilitate an understanding of the problem of self-interference in a wireless radio system with a device such as the one shown in FIG. 2C capable of simultaneous transmission and reception via a shared receive and transmit antenna.

The second path of interference is Antenna Path, the shortest path between the transmitter and receiver antenna by which a transmitted signal reach the antenna being used for receiving signals. In the case of a dual antenna system as shown in FIG. 3A this interference path will normally be the path 301 which corresponds to the distance between the transmit antenna 229 and receive antenna 231. For single antenna system, such as the one shown in FIG. 3B, the antenna path is the path 302' taken by the transmit signal in the near-field of the antenna after reflection. The reflections from the antenna can be due to the mismatch in the impedance. The Antenna Path is time varying and frequency selective. The signal received from this path is roughly 20-45 dB lower than the transmit power of the signal with the path delay in the range of 400 picoseconds to 1.5 nanoseconds based on the radio and antenna design.

The third main principle path of self-interference is the Scatter Path. The transmitted signals 303 in this path travel from the transmit antenna 229 to the environment 305 and echo back as reflections 304 from environmental objects 305 which operate as signal scatters. This path is also time varying and most frequency selective among the three paths. The overall path delay is very wide depending on the environment around the radio, roughly between 10 s of nanosecond to 5 microseconds. The signals from this path are received with 50 dB or lower below the transmit power depending on the frequency of operation and path loss in the environment.

Based on the above characterization, the RF self interference cancellation architecture described herein is designed to reconstruct the self-interference by tracking and applying characteristic of the direct path, antenna path and scatter path to a copy of signal 223 resulting in interference cancellation signal 224 and adding interference cancellation signal 224 to the received signal at 209.

FIG. 4 diagram shows categorization of reconstruction of the self-interference for these three paths as 181, 182, and 183 based on the amount of delay required to reconstruct the interference signal. The blocks 181, 182 and 183 have delay elements that are tunable from a controller through a voltage/current controlled interface bus 191. Block 181 includes delay elements (402, 403, . . . , 405) which are tunable via control signals (421, 422, . . . , 423), respectively, from controller 401 communicated through bus 191. Block 182 includes delay element 406 which is tunable via control signal 424 from controller 401 communicated through bus 191. Block 183 includes delay element 407 which is tunable via control signal 425 from controller 401 communicated through bus 191. The inputs of delay elements (402, 403, . . . , 405, 406, 407) are signals (426, 427, . . . , 428, 429, 430), respectively, and the outputs of delay elements (402, 403, . . . , 405, 406, 407) are signals (436, 437, . . . , 438, 439, 440), respectively FIG. 4 also shows attenuation/amplification devices (408, 409, . . . , 410, 411, 412), which process input signals (436, 437, . . . , 438, 439, 440) and generate output signals (450, 451, . . . , 452, 453, 454), respectively. The attenuation/amplification devices (408, 409, . . . , 410, 411, 412) are also controlled by controller 401 through voltage/current interface bus 192 via control signals (431, 431, . . . , 433, 434, 435), respectively. In various embodiments coefficients communicated in signals (431, 432, . . . , 433, 434, 435) also come with the capability of inverting the phase of RF signal in addition to controlling attenuation/amplification. The elements 184, 185, 186, 187, 188, 189 are elements that route the same RF signals 223 from input to multiple outputs (426, 427, 428, 429, 430). These elements (184, 185, 186, 187, 188, 189) can be, and in some embodiments are, RF power dividers or balun circuits (balanced-unbalanced) or another RF element with the routing capability. The element 190 in this Figure is an element that combines multiple RF signals (450, 451, 452, 453, 454) together to generate signal 224. Element 190 can be, and in some embodiments is, a multi-port RF power combiner or an array of RF combiners to sum the signals together.

Figure 5:
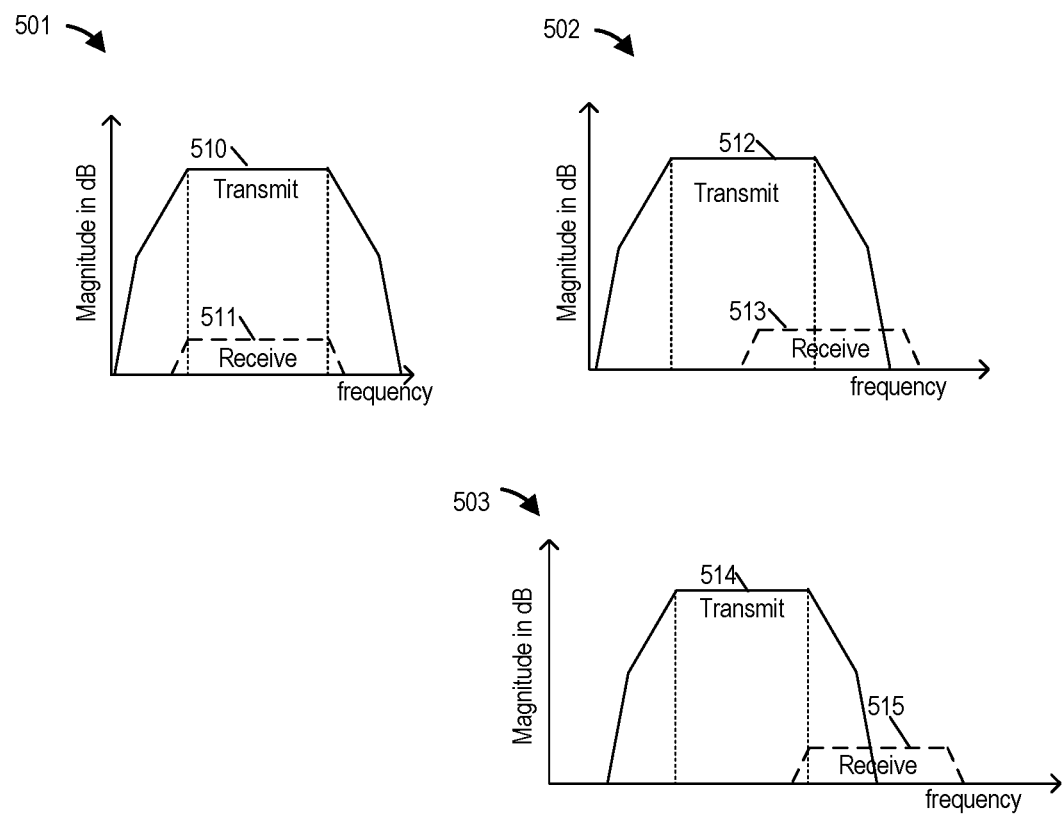
FIG. 5 includes drawings, illustrating three scenarios of simultaneous transmission and reception operation where self-interference cancellation in accordance with the invention can improve the operation of a radio device.

FIG. 5 includes drawings 501, 502 and 503, illustrating three scenarios of simultaneous transmission and reception operation where self-interference cancellation can improve the operation of a radio device: in-band operation depicted in drawing 501 by 510 and 511, overlapping band operation as shown in drawings 502 by 512 and 513, and adjacent band operation depicted in drawing 503 by 514 and 515. In the above cases, the ability to cancel the interference arising from a transmission allows the radio to operate in the appropriate dynamic range to demodulate and decode the intended receive signal.

Figure 6A:
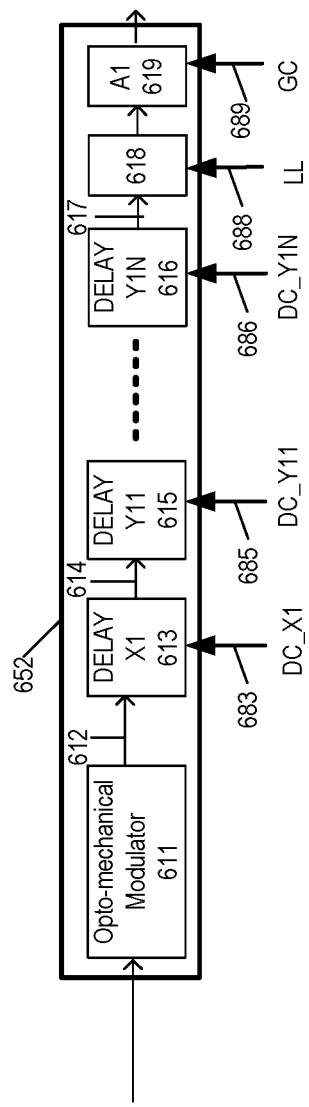
FIG. 6A illustrates a first signal reconstruction bank which can be used in an RF up-converter and interference cancelation filter circuit such as the ones shown in FIGS. 2B and 2C as well as the one shown in FIG. 4 and which can perform various signal delay and gain control functions.

FIG. 6A depicts an exemplary novel architecture of a optical modulator, signal delay and signal gain block 652 which can be used as the signal reconstruction bank 181, 182 or 183 of FIG. 4 or can be used in various other embodiments shown in the present application. The reconstruction banks are responsible for operations on the input including delay used to cause a signal delay and a multiply used to control signal gain and thus how much an impact the delayed signal generated by block 652 will contribute to the overall composite output generated by combining the output of signal delay and gain control blocks 652.

Optical modulator, signal delay and signal gain block 652 includes an optical-mechanical modules 611, delay element X 613, delay element Y11 615, delay element Y1N 616, optical waveguide 618, and gain element A1 619. Delay control signal DC_X1 683 controls delay element X 613. Delay control signal DC_Y11 685 controls delay element Y11 615. Delay control signal Y1N 686 controls delay element Y1N 616. Input laser light signal 688 is received by optical waveguide 618. Gain Control (GC) signal 689 controls gain element A1 619.

Figure 6B:
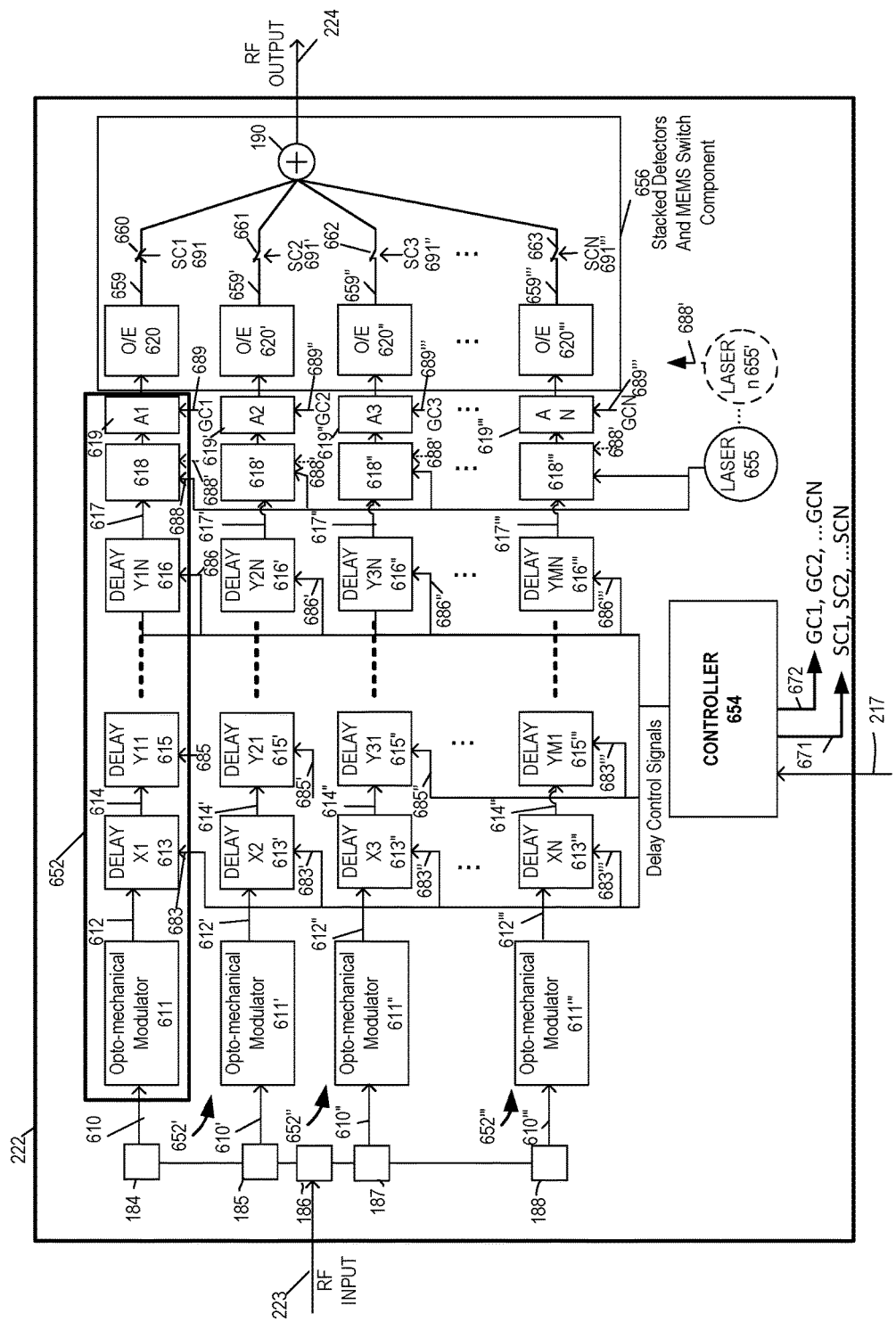
FIG. 6B illustrates an exemplary RF up-converter and interference cancelation filter circuit implemented using multiple signal reconstruction banks of the type shown in FIG. 6A but, e.g., with different delays and/or gains.

FIG. 6B shows an exemplary RF up-converter and interference cancelation filter circuit 222 that can be used in the system of FIG. 2B or 2C and which can be implemented using multiple modulation, delay and gain control blocks, e.g., N of such blocks, of the type shown in FIG. 6A along with various other components such as controller 654 and laser 655. Controller 654 receives signal 217 from channel estimator, filter and filter control circuit 216 and uses the information communicated in signal 217 including, e.g., determined coefficient values. In some embodiments, RF up-converter and interference cancelation filter circuit 222 includes multiple lasers, e.g., laser 655 which generates laser light signal 688 and laser n 655' which generates laser light signal 688'. In some such embodiments, one of the laser light signals 688 or 688' is used an the input to an optical waveguide, e.g., optical waveguide 618, at a particular time. Component block 652 includes an optical mechanical module 611 with an output 612 that is coupled to a series arrangement of delays x1 613, Y11 615 through Y1N 616 where N is used to represent an integer number greater than 1. The delays are controllable in the FIG. 6A embodiment but it should be appreciated that one or more of the delays could be of a fixed amount. The first delay element 613 is controlled by delay control (DC) signal DC_X1 683. The second delay element 615 is controlled by delay control (DC) signal DC_Y11 685. The Nth delay element 616 is controlled by delay control (DC) signal DC_Y1N 686. The output of the series of delay elements is provided to an optical waveguide 618 for transduction from mechanical waves to optical carrier which receives as an input a laser light signal LL 688 prior to being subject to a gain control operation performed by multiplier A1 619. The gain operation performed by element 619 is controlled by gain control signal GC 689. With regard to FIG. 6B, the delay element control signals (683, 683', 683", . . . , 683''', 685, 685', 685", . . . , 685''', . . . , 686, 686', 686' . . . , 686''') and gain control signals (689, 689', 689", . . . , 689''') used to control each of the delays and gains to be used is provided by a controller 654. Gain control signals (GC1 689, GC2 689', GC3 689", . . . , GCN 689'''), communicated from controller 654 via gain control bus 672, are used to control gain control elements (A1 619, A2 619', A3 619", . . . , AN 619'''), respectively.

In the exemplary RF up-converter and interference cancelation filter circuit 222 shown in FIG. 6B there are N implementations of block 652 with the elements of the first block 652 being surrounded by a box for illustration purposes. The box is omitted from block 652' corresponding to the second row of elements, block 652" corresponding to the third row of comments and block 652''' corresponding to the Nth row of components for space and illustration purposes.

FIG. 6B describes device design of the RF up-converter and interference cancelation filter circuit 222 of FIG. 2B to 2E. The main idea of the design architecture presented in FIG. 6B is to realize a novel RF signal processing circuit that can be built using elements 611, 613, 615, 616, 618, 619, 620, 660. The device 222 has an input RF signal 223 that connects to the element 186 in the device 222. The element 186 can be a power divider/splitter/balanced-unbalanced circuit that can split the signal in to two or more arms that contain a copy of the input signal with possibly varying degree of amplitudes. The output of the element 186 can go to other elements such as element 185- and element 187, which are similar in function to element 186. An first output of element 185 goes to element 184 and a second output of element 185, signal 610', is an input to opto-mechanical modulator 611'. An output of element 185 is output signal 610, which is an input signal for opto-mechanical modulator 611. An first output of element 187 goes to element 188 and a second output of element 187, is signal 610", which is an input to opto-mechanical modulator 611". An output of element 188 is output signal 610''', which is an input signal for opto-mechanical modulator 611, The output signal 610 of element 184 goes to device 652 that converts, via opt-mechanical modulator 611, the input signal 610 to mechanical wave 612 and then ultimately to the optical signal through the element 618, an optical waveguide that allows transduction of mechanical waves to optical carrier that in turn transfers the RF signal 610 over to the optical carrier from the laser 655. The mechanical signal 612 that includes the RF input signal 610 can be, and in some embodiments is, delayed using the delay elements (613, 615, . . . 616). The delay can be, and in some embodiments is, configured using the delay control (DC) signals (683, 685, . . . 686) from the controller 654. The amplitude of the optical signal out from the optical waveguide 618 can be tuned by the element 619. The output optical signal from the element 619 then undergoes optical to electrical conversion in the element 620.

The output signal 610' of element 185 goes to device 652' that converts, via opt-mechanical modulator 611', the input signal 610' to mechanical wave 612' and then ultimately to the optical signal through the element 618', an optical waveguide that allows transduction of mechanical waves to optical carrier that in turn transfers the RF signal 610' over to the optical carrier from the laser 655. The mechanical signal 612' that includes the RF input signal 610' can be, and in some embodiments is, delayed using the delay elements (613', 615', . . . 616'). The delay can be, and in some embodiments is, configured using the delay control (DC) signals (683', 685', . . . 686') from the controller 654. The amplitude of the optical signal out from the optical waveguide 618' can be tuned by the element 619'. The output optical signal from the element 619' then undergoes optical to electrical conversion in the element 620'.

The output signal 610" of element 187 goes to device 652" that converts, via opt-mechanical modulator 611", the input signal 610" to mechanical wave 612" and then ultimately to the optical signal through the element 618", an optical waveguide that allows transduction of mechanical waves to optical carrier that in turn transfers the RF signal 610" over to the optical carrier from the laser 655. The mechanical signal 612" that includes the RF input signal 610" can be, and in some embodiments is, delayed using the delay elements (613", 615", . . . 616"). The delay can be, and in some embodiments is, configured using the delay control (DC) signals (683", 685", . . . 686") from the controller 654. The amplitude of the optical signal out from the optical waveguide 618" can be tuned by the element 619". The output optical signal from the element 619" then undergoes optical to electrical conversion in the element 620".

The output signal 610''' of element 188 goes to device 652''' that converts, via opt-mechanical modulator 611''', the input signal 610''' to mechanical wave 612''' and then ultimately to the optical signal through the element 618''', an optical waveguide that allows transduction of mechanical waves to optical carrier that in turn transfers the RF signal 610''' over to the optical carrier from the laser 655. The mechanical signal 612''' that includes the RF input signal 610''' can be, and in some embodiments is, delayed using the delay elements (613''', 615''', . . . 616'''). The delay can be, and in some embodiments is, configured using the delay control (DC) signals (683''', 685''' . . . 686''') from the controller 654. The amplitude of the optical signal out from the optical waveguide 618''' can be tuned by the element 619'''. The output optical signal from the element 619''' then undergoes optical to electrical conversion in the element 620'''.

Device 222 of FIG. 6B includes stacked detectors and MEMS switch component 656. Component 656 includes the optical to electrical conversion devices (O/E 620, O/E 620', O/E 620", . . . , O/E 620'''), coupled to controllable MEMS switches (MEMS switch 1 660, MEMS switch 2 661, MEMS switch 3 662, . . . , MEMS switch N 663), respectively. MEMS switches (MEMS switch 1 660, MEMS switch 2 661, MEMS switch 3 662, . . . , MEMS switch N 663), are controlled via switch control signals (SC1 691, SC2 691', SC3 691", . . . , SCN 691'''), respectively, communicated from controller 654 via switch control bus 671.

Component further includes combiner element 190 which receives RF output outputs signals from the outputs of one or more O/Es (620, 620', 620", . . . , 620'''), which pass through the switches, which are being controlled to be closed at a given time, and generates RF output signal 224.

The device designs shown in one or more of FIGS. 6A, 6B, 7A, 7B, 7C and 7D take advantage of the fact that signal delay and/or the control of how much signal delay is achieved, can take advantage of the fact that that sound waves travel 105 times slower than RF electromagnetic waves. The principle working of one of the arms, e.g., optical modulator, delay and gain blocks 652, will now be described in with reference to FIGS. 7A-D which show various exemplary devices that perform optical to mechanical modulation, signal delay, and/or gain control which in some embodiments may be, and often is, controlled. The different embodiments shown in FIG. 7A to 7D may use different approaches to one or more of the functions implemented by a signal processing block, e.g., block 652.

Figure 7A:
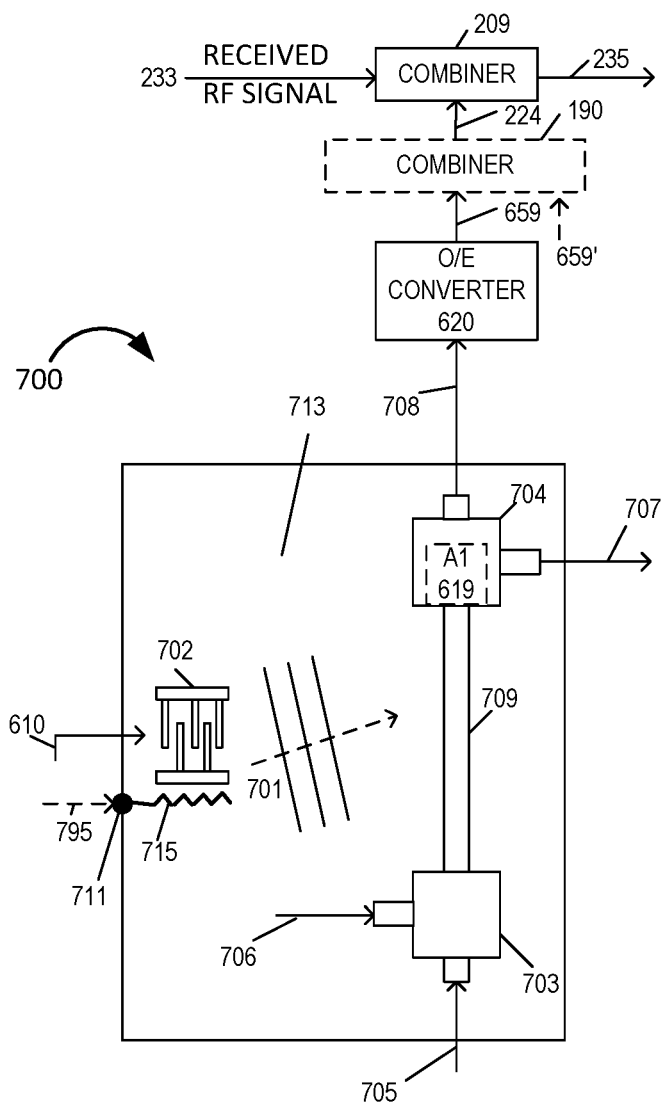
FIG. 7A shows a first device which can be used to perform optical-mechanical signal modulation, signal delay and/or gain control in accordance with one embodiment of the invention.

FIG. 7A illustrates a device 700 which can be used as block 652 of FIG. 6A. The high level function of the device 700 is to convert the input RF signal 610 from the analog RF signal to the acoustical signal 701 using a piezo-structure or an opto-mechanical structure 702 which then uses the phenomenon of phonon-photon transduction to transfer the RF signal 610 from acoustical signal 701 over to the optical carrier 705 or 706 that is travelling over the waveguide 709. The orientation at which the signal 701 will affect where the signal reaches the waveguide 709 and the angle at which the signal reaches the wave guide. By changing the direction of the acoustic signal delay and gain can be controlled by altering the location and angle of transduction. The structure 702 acts as an array capable of tuning the angle of transduction as described in the figure based on the input signal from control 705. The components 703 and 704 are mode converters that allow for multiplexing of input optical signals 705 and 706 with different modes and de-multiplexing of output signals 707 and 708 based on different modes. This capability of mode-converter based multiplexing allows for single sideband electrical to optical conversion using phonon-photon transduction. In various embodiments, at a given time one of input signals 705, 706 is used and one of output signals 707, 708 is used.

In some embodiments, structure 702 of FIG. 7A is opto-mechanical modulator 611 of FIG. 6B, waveguide 709 of FIG. 7A is waveguide 618 of Figure, input optical signal 705 is optical carrier 688 from laser 655 of FIG. 6B, input optical signal 706 is optical carrier 688' from laser n 655' of FIG. 6B, and control signal 795 is a control signal from controller 654 which controls the angle of transduction, e.g., moving or changing the structure 702 or its orientation, changing delay and/or gain in a similar manner to using delay elements (613, 615, . . . 616) with controls signals (683, 685, . . . , 686), and gain element 619 with control signal GGC 689. The control signal 795 is received at control input 711 and is used to control heater 715. In some but not all embodiments, device 704 includes a controllable gain element A1 619. Output optical signal 708 is converted by O/E converter 620 to RF output signal 659. In some embodiments, optional combiner 190 is included which may, and sometimes does combines RF output signal 659 with one or more RF output signals, e.g., RF output signal 659', to generate RF output signal 224. In other embodiments, optional combiner 190 is not included and RF output signal 190 is the same as RF output signal 224. RF output signal 224 is an interference cancellation signal. Combiner combines received signal 233 with interference cancellation signal 224 to generate RF signal 235.

Figure 7B:
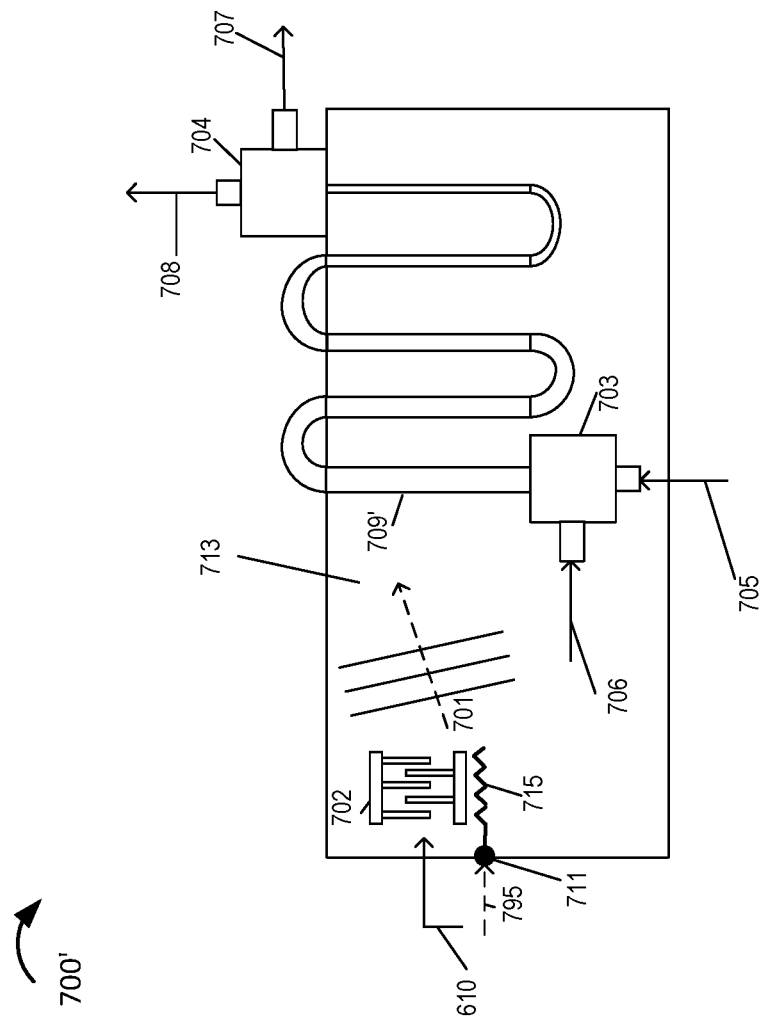
FIG. 7B shows a second device which can be used to perform optical-mechanical signal modulation, signal delay and/or gain control in accordance with one embodiment of the invention.

The phonon-photon transduction phenomenon described in the FIG. 7A is presented with a differentiation in FIG. 7B in device 700' where the waveguide 709' is shown to be of varying width. The varying waveguide width allows for change in the optical dispersion which in turn allows for change in the optical wavelength that satisfies the phase matching conditions. In this case, the optical wavelength sets the active segment in 709' where the photo-acoustic transduction occurs. This basically allows for control of delay using the optical carrier wavelength with the general phenomenon of higher delay with increasing distance of the point of transduction. The waveguide 709' describes decreasing width of the waveguide from left to right. However, several embodiments are possible with various increasing and decreasing combination of waveguide width for practical implications.

Figure 7C:
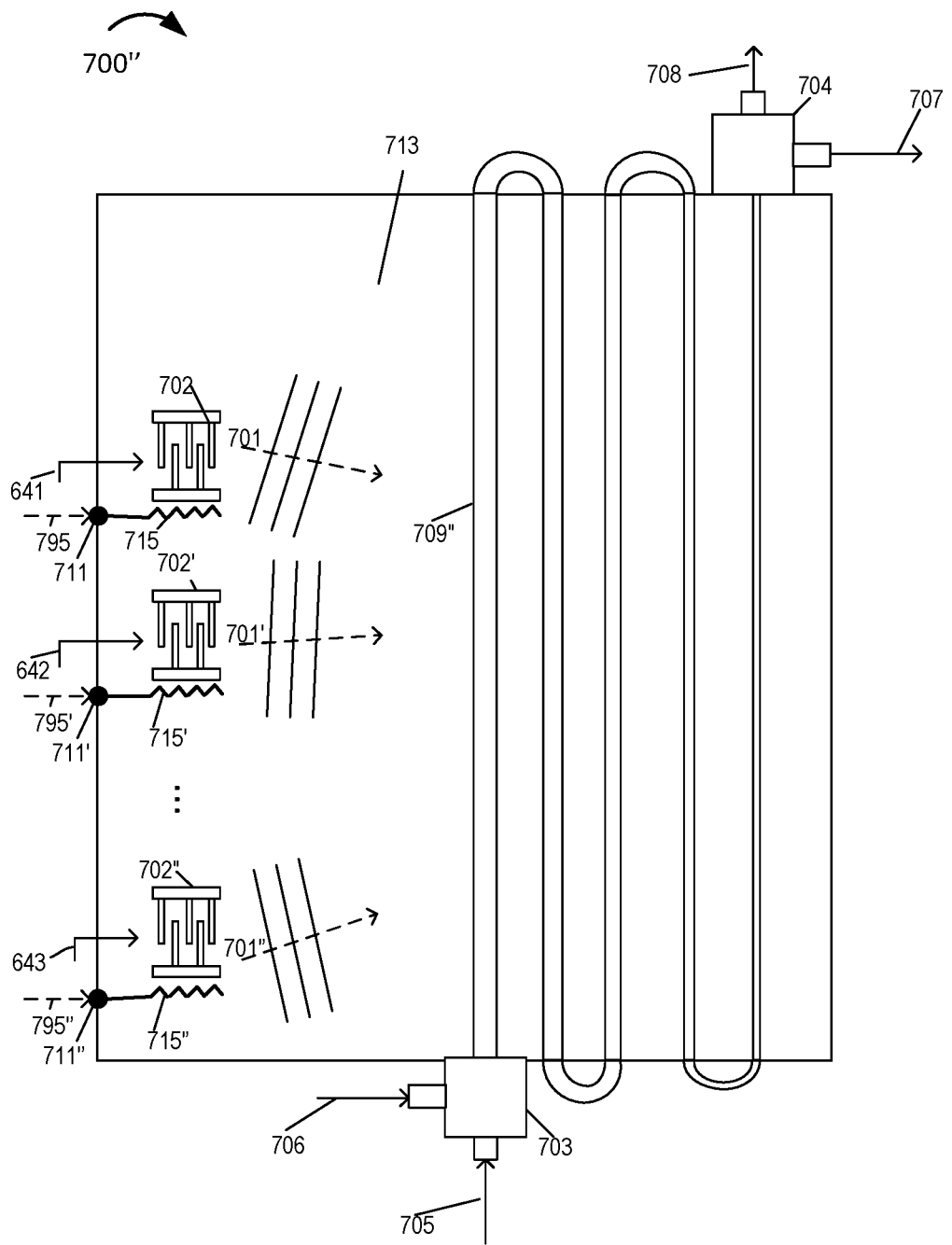
FIG. 7C shows a third device which can be used to perform optical-mechanical signal modulation, signal delay and/or gain control in accordance with one embodiment of the invention.

FIG. 7C shows an architecture of device 700" which can be used as block 652, that allows for multiple RF signal input in the form of 641, 642, 643 and more, as well as plurality of structures (702, 702', 702") that allows for multiple RF signals to be transconducted to the optical carrier with a varying delay. The angle of transduction controlled at (702, 702',702") allows for coarse and fine tunability of delay in transduction of input RF signals 641, 642 and 643. The input signals 641, 642 and 643 can be considered as the same signals split in to 641, 642, 643 or different signals. In one exemplary embodiment signals (641, 642, 643) are signals (610, 610', 610"), respectively. Structure 702 converts the input RF signal 641 from the analog RF signal to the acoustical signal 701. The structure 702 acts as an array capable of tuning an angle of transduction based on the input from control signal 795. Structure 702 converts the input RF signal 642 from the analog RF signal to the acoustical signal 701'. The structure 702' acts as an array capable of tuning an angle of transduction based on the input from control signal 795'. Structure 702" converts the input RF signal 643 from the analog RF signal to the acoustical signal 701. The structure 702" acts as an array capable of tuning an angle of transduction based on the input signal from control signal 795". In some embodiments, a single control signal 795 is used to control the angle of transduction for each of the structures (702, 702' 702"). The structure 700" defined here can be used to perform a general analog signal processing on the RF signal using the varying delay and amplitude capability.

Figure 7D:
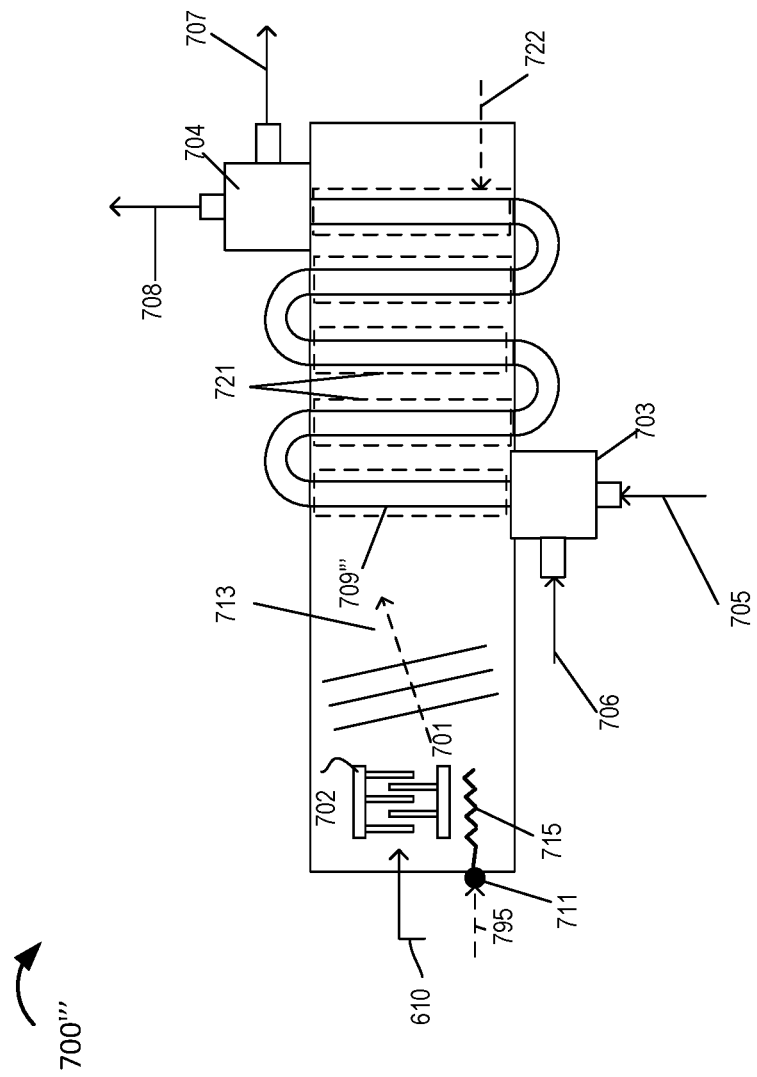
FIG. 7D shows a fourth device which can be used to perform optical-mechanical signal modulation, signal delay and/or gain control in accordance with one embodiment of the invention.

FIG. 7D diagram shows device 700''', which is an alternative design of block 652. where the phenomenon of phonon-photon transduction can be controlled using heating elements shown by 721. In some embodiments the heating element 721 includes a plurality of separate individually controllable heaters. The waveguides 709''' shown in the FIG. 7D with uniform width along with the controlled heater 721 allows for change of target area of phonon-photon transduction. The heaters 721 are current/voltage controlled and are one or more heater control input signals 722 from the controller, e.g, controller 654. This embodiment is also applicable to the architecture with multiple RF input signals as depicted in FIG. 7C.

The depiction structures, 652 of FIG. 6B, 700 of FIG. 7A, 700' of FIG. 7B, 700" of FIG. 7C and 700''' of FIG. 7D, of block 652 can be constructed using single/multi-port acoustic-optical modulator which could be realized using, e.g., Aluminum Nitride on oxide/sapphire, or another similar material, such as, e.g., GaN on oxide/sapphire, which provides similar capability of converting RF signal to acoustical signal and further phonon-photon transduction. This can be constructed based on, but not limited to, using the phenomenon of Stimulated Brillouin Scattering (SBS) for creating such architecture.

Figure 8:
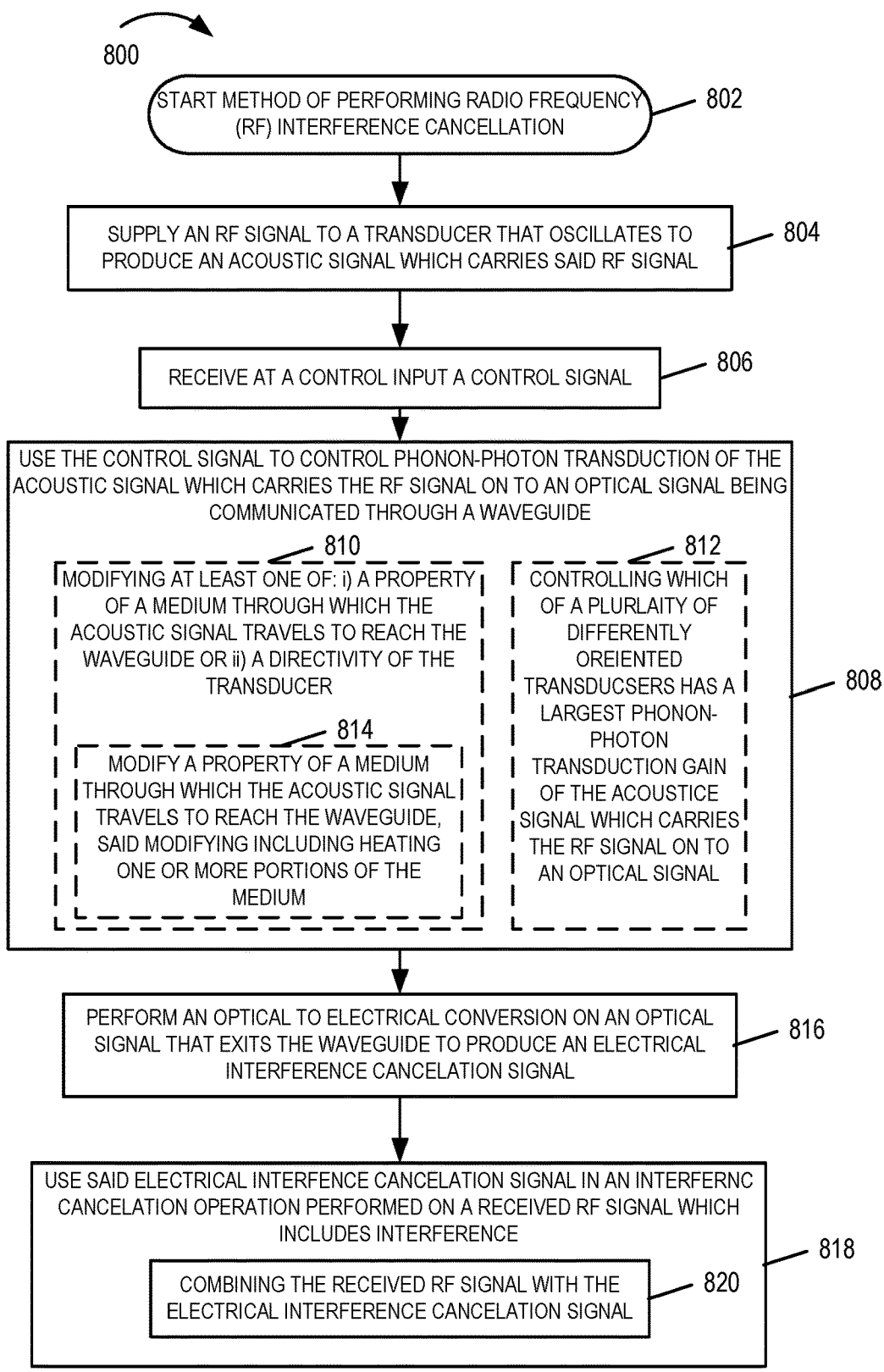
FIG. 8 is a flowchart of an exemplary method of performing radio frequency (RF) interference cancellation in accordance with an exemplary embodiment.

FIG. 8 is a flowchart 800 of an exemplary method of performing radio frequency (RF) interference cancellation in accordance with an exemplary embodiment. Operation starts in step 802 and proceeds to step 804. In step 804 an RF signal (610) is supplied to a transducer (702) that oscillates to produce an acoustic signal (710) which carries said RF signal. Operation proceeds from step 804 to step 806. In step 806 a control input (711) receives a control signal (705). Operation proceeds from step 806 to step 808.

In step 808 the control signal (705) is used to control phonon-photon transduction of the acoustic signal (701) which carries the RF signal (610) on to an optical signal (705 or 706) being communicated through a waveguide (709). In some embodiments, step 808 includes one or both of steps 810 and 812. In step 810 at least one of: i) a property of a medium (713) through which the acoustic signal travels to reach the waveguide (709) or ii) a directivity of the transducer is modified. The medium 713 maybe and sometimes is the material which supports waveguide 709 and/or surrounds waveguide 709 or the wave guides shown in other figures. In some embodiments, said modifying alters a gain of said phonon-photon transduction. In some embodiments, said modifying alters a location of said phonon-photon transduction thereby controlling an amount of signal delay. In some embodiments, said modifying changes the angle at which the acoustic wave propagates toward the waveguide. In some embodiments, step 810 includes step 814 in which a property of a medium (713) through which the acoustic signal travels to reach the waveguide is modified, said modifying including heating one or more portions of the medium, e.g., via heater 715. In step 812 which of a plurality of different oriented transducers (702, 702', 702") has a largest phonon-photon transduction gain of the acoustic signal which carries the RF signal on to an optical signal are controlled. Operation proceeds from step 808 to 816. In step 816 an optical to electrical conversion is performed, e.g., by O/E device 620, on an optical signal (707 or 708) that exits the waveguide (709) to produce an electrical interference cancellation signal. Operation proceeds from step 816 to step 818. In step 818 the electrical interference cancellation signal is used in an interference cancellation operation performed on a received RF signal which includes interference. Step 818 includes step 820. In step 820 the received RF signal is combined with the electrical interference cancellation signal.

Various exemplary numbered apparatus and method embodiments will now be discussed.

Apparatus embodiment 1 in directed to an apparatus comprising: a digital interference cancelation element (216) between a digital transmit element (206) and a receiver element (214) for generating a filter delay control signal (217) and a baseband interference cancelation signal 221; a combining element (209) in an RF receiver signal path; and an RF cancelation filter (222) positioned between an RF transmit signal path and the combining element (209) in an RF receiver signal path, the combining element receiving at a first input an RF frequency signal generated by the RF cancelation filter (222) from a signal received from the RF signal transmit path which is delayed in accordance with delay control information received from the digital interference cancelation element (216).

Apparatus embodiment 2 includes the apparatus of embodiment 1, wherein the combining element subtracts the RF frequency signal generated by the RF cancelation filter (222) from a received signal supplied to a received signal input of the combiner (209).

Apparatus embodiment 3 includes the apparatus of embodiment 1, wherein the combining element is an adder which adds the RF frequency signal generated by the RF cancelation filter (222) from a received signal supplied to a received signal input of the combiner (209); and wherein the cancelation signal is an inverse of an estimate of a received interference signal.

Apparatus embodiment 4 includes the apparatus of embodiment 1, wherein said RF cancelation filter (222) includes: a first interference signal component generation chain (652) including a first opto-mechanical modulator (611) and a first configurable delay element (613), and a first optical to electrical (O/E) converter (620) for generating an electrical version of the first interference signal component.

Apparatus embodiment 5 includes the apparatus of embodiment 4, wherein said RF cancelation filter (222) further includes: a second interference signal component generation chain (652') including a second opto-mechanical modulator (611') and a second configurable delay element (613'), and a second optical to electrical (O/E) converter (620') for generating an electrical version of the first interference signal component.

Apparatus embodiment 6 includes the apparatus of embodiment 5, further comprising: an interference component signal combiner (190) for combining the electrical versions of said first and second interference signal components to generate a composite RF interference signal (224), said composited RF interference signal being the RF frequency signal generated by the RF cancelation filter (222).

Apparatus embodiment 5 includes the apparatus of embodiment 6, further comprising: a first switch (660) between the first O/E converter (620) and a first input of said interference signal component combiner (190); a second switch (661) between the second O/E converter (620') and a second input of said interference signal component combiner (190); and a controller (654) for receiving the filter delay control signal (217) from the digital interference cancelation element (216) and controlling said first and second switches (660), (661) based on the amount of delay to be applied to the received RF signal as part of generation of the RF frequency signal to be subtracted from the received RF signal.

Apparatus embodiment 5 includes the apparatus of embodiment 6, wherein the first opto-mechanical module (611) includes piezo-structure or opto-mechancical structure (702) to perform an RF to acoustical signal conversion operation.

Apparatus embodiment 9 includes the apparatus of embodiment 8, wherein the a first interference signal component generation chain further includes a first waveguide (709, 709', 709'', 709''' or 709''''), said acoustic signal influencing a first optical carrier (705) or (706) passing through said first waveguide (709, 709', 709'', 709''', or 709'''') prior to reaching said first O/E converter (620).

Apparatus embodiment 10 includes the apparatus of embodiment 9, wherein said first waveguide (709') varies in width.

Apparatus embodiment 11 includes the apparatus of embodiment 6, wherein the first opto-mechanical module includes a plurality of piezo-structures or opto-mechancical structures (702, 702', 702'') to perform an RF to acoustical signal conversion operation, which one or ones of the opto-mechanical structures (702) is used to influence an optical signal passing through a first waveguide (709') influencing the signal delay introduced by said first interference signal component generation chain (652) when generating the first interference signal component.

Apparatus embodiment 12 includes the apparatus of embodiment 9, wherein the first interference signal component generation chain (652) further includes: a plurality of heaters (721) positioned along different portions of the first waveguide (709'''), said controller (654) controlling one or more of said heaters (721) to be in an on-state, which of said heaters (721) being controlled to be in said on-state influencing a signal delay introduced by the use of said first wave guide (709').

Method embodiment 13 is directed to a method of performing radio frequency (RF) interference cancelation comprising: supplying an RF signal to a transducer (702) that oscillates to produce an acoustic signal which carries said RF signal; receiving at a control input (711) a control signal (705); using the control signal (705) to control phonon-photon transduction of the acoustic signal which carries the RF signal on to an optical signal (705 or 706) being communicated through a waveguide (709); and performing an optical to electrical conversion on an optical signal (707 or 708) that exits the waveguide (709) to produce an electrical interference cancelation signal (708); and using said electrical interference cancelation signal in an interference cancelation operation performed on a received RF signal which includes interference.

Method embodiment 14 is directed to the method embodiment 13, wherein using said electrical interference signal in an interference cancelation operation includes: combining the received RF signal (233) with the electrical interference cancelation signal ((224 or 659)).

Method embodiment 15 is directed to the method embodiment 14, wherein using the control signal (705) to control phonon-photon transduction of the acoustic signal which carries the RF signal on to an optical signal (705 or 706) being communicated through a waveguide (709, 709' or 709'') includes: modifying at least one of: i) a property of a medium (713) through which the acoustic signal travels to reach the waveguide (709, 709', or 709''); ii) a property of the waveguide (709, 709' or 709''), or iii) a directivity of the transducer (702).

Method embodiment 16 is directed to the method embodiment 14, wherein using the control signal (705) to control phonon-photon transduction of the acoustic signal which carries the RF signal on to an optical signal (705 or 706) being communicated through a waveguide (709) includes: modifying a property of the medium (713) through which the acoustic signal travels to reach the waveguide (709) or modifying a property of the waveguide (709, 709' or 709''), said modifying including heating (e.g., using one or more heating elements 715) one or more portions of the medium (713) or waveguide (709, 709' or 709''). This can cause the orientation of a transducer 702 to change and/or the angel at which the acoustic signal 701 travels from the transducer 702 towards the wave guide and thus the location and/or strength of transduction.

Method embodiment 17 is directed to the method embodiment 15, wherein said modifying alters a gain of said phonon-photon transduction.

Method embodiment 18 is directed to the method embodiment 16, wherein said modifying alters a location of said phonon-photon transduction thereby controlling an amount of signal delay.

Method embodiment 19 is directed to the method embodiment 14, wherein using the control signal (705) to control phonon-photon transduction of the acoustic signal which carries the RF signal on to an optical signal (705 or 706) includes: controlling which of a plurality of differently oriented transducers (702, 702', 702'') has a largest phonon-photon transduction gain of the acoustic signal which carries the RF signal on to an optical signal.

Apparatus embodiment 20 is directed to a radio frequency (RF) interference cancelation apparatus comprising: a transducer (702) that oscillates to produce an acoustic signal which carries an RF signal supplied as an input to said transducer (702); a control input (711) that receives a control signal (705) used to control signal (705) control phonon-photon transduction of the acoustic signal which carries the RF signal on to an optical signal (705 or 706) being communicated through a waveguide (709); and an optical to electrical converter (620) that converts an optical signal (707 or 708) that exits the waveguide (709) to an electrical interference cancelation signal; and a combiner (190) for combining said electrical interference cancelation signal with a received RF signal which includes interference.

Apparatus embodiment 21 includes the apparatus of embodiment 20, further comprising: at least one heating element (715 or 721) positioned along a portion of said waveguide or transducer (702) which is controlled by said control signal (705).

Apparatus embodiment 22 includes the apparatus of embodiment 21, wherein the first transducer (702) is one of a plurality of differently oriented transducers (702, 702', 202").

In various embodiments an interference cancelation signal is generated and then combined with a received signal to reduce interference, e.g., before further processing of the received signal. In various embodiments the interference cancelation signal is an estimate of the received interference and has the same shape as the interference signal. In such cases the combining operation involves a subtraction operation with the combiner subtracting the interference cancellation signal from the received signal. In other embodiments the interference cancelation signal that is generated has the form of an inverse of the received interference signal. In such cases the combining to cancel interference involves adding the interference cancelation signal to the received signal and, because of its inverse form, the combining effectively subtracts the estimate of the interference from the received signal. Thus, it should be appreciated that the combining can be either a addition or subtraction and still achieve the desired interference cancelation depending on the form of the generated interference signal.

The techniques of various embodiments may be implemented using software, hardware and/or a combination of software and hardware. Various embodiments are directed to apparatus, e.g., communications devices, e.g., nodes such as mobile wireless terminals, base stations, and/or communications system. Various embodiments are also directed to methods, e.g., method of controlling and/or operating a communications device, e.g., a wireless terminals, base stations and/or communications systems. Various embodiments are also directed to non-transitory machine, e.g., computer, readable medium, e.g., ROM, RAM, CDs, hard discs, etc., which include machine-readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various embodiments, devices described herein are implemented using one or more modules to perform the steps corresponding to one or more methods, for example, signal generation, processing, receiving and/or transmitting steps. Thus, in some embodiments various features are implemented using modules. Such modules may be implemented using software, hardware or a combination of software and hardware. In some embodiments modules are implemented fully in hardware, e.g., as individual circuits. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple, or all of the steps of one or more methods of the invention.

In some embodiments, the processor or processors, e.g., CPUs, of one or more devices, e.g., communications devices such as wireless terminals (UEs), and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

The methods and apparatus of various embodiments are applicable to a wide range of communications systems including many cellular and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. An apparatus comprising:
a digital interference cancelation element between a digital transmit element and a receiver element for generating a filter delay control signal and a baseband interference cancelation signal;
a combining element in an RF receiver signal path; and
an RF cancelation filter positioned between an RF transmit signal path and the combining element in an RF receiver signal path, the combining element receiving at a first input an RF frequency signal generated by the RF cancelation filter from a signal received from the RF signal transmit path which is delayed in accordance with delay control information received from the digital interference cancelation element.

2. The apparatus of claim 1, wherein the combining element subtracts the RF frequency signal generated by the RF cancelation filter from a received signal supplied to a received signal input of the combiner.

3. The apparatus of claim 1,
wherein the combining element is an adder which adds the RF frequency signal generated by the RF cancelation filter from a received signal supplied to a received signal input of the combiner; and
wherein the cancelation signal is an inverse of an estimate of a received interference signal.

4. The apparatus of claim 1, wherein said RF cancelation filter includes:
a first interference signal component generation chain including a first opto-mechanical modulator and a first configurable delay element, and a first optical to electrical (O/E) converter for generating an electrical version of the first interference signal component.

5. The apparatus of claim 4, wherein said RF cancelation filter further includes:
a second interference signal component generation chain including a second opto-mechanical modulator and a second configurable delay element, and a second optical to electrical (O/E) converter for generating an electrical version of the first interference signal component.

6. The apparatus of claim 5, further comprising:
an interference component signal combiner for combining the electrical versions of said first and second interference signal components to generate a composite RF interference signal, said composited RF interference signal being the RF frequency signal generated by the RF cancelation filter.

7. The apparatus of claim 6, further comprising:
a first switch between the first O/E converter and a first input of said interference signal component combiner,
a second switch between the second O/E converter and a second input of said interference signal component combiner; and
a controller for receiving the filter delay control signal from the digital interference cancelation element and controlling said first and second switches based on the amount of delay to be applied to the received RF signal as part of generation of the RF frequency signal to be subtracted from the received RF signal.

8. The apparatus of claim 6, wherein the first opto-mechanical module includes piezo-structure or opto-mechanical structure to perform an RF to acoustical signal conversion operation.

9. The apparatus of claim 8, wherein the a first interference signal component generation chain further includes a first waveguide, said acoustic signal influencing a first optical carrier passing through said first waveguide prior to reaching said first O/E converter.

10. The apparatus of claim 9, wherein said first waveguide varies in width.

11. The apparatus of claim 6, wherein the first opto-mechanical module includes a plurality of piezo-structures or opto-mechanical structures to perform an RF to acoustical signal conversion operation, which one or ones of the opto-mechanical structures is used to influence an optical signal passing through a first waveguide influencing the signal delay introduced by said first interference signal component generation chain when generating the first interference signal component.

12. The apparatus of claim 9, wherein the first interference signal component generation chain further includes:
a plurality of heaters positioned along different portions of the first waveguide, said controller controlling one or more of said heaters to be in an on-state, which of said heaters being controlled to be in said on-state influencing a signal delay introduced by the use of said first wave guide.

13. A method of performing radio frequency (RF) interference cancelation comprising:
supplying an RF signal to a transducer that oscillates to produce an acoustic signal which carries said RF signal;
receiving at a control input a control signal;
using the control signal to control phonon-photon transduction of the acoustic signal which carries the RF signal on to an optical signal being communicated through a waveguide; and
performing an optical to electrical conversion on an optical signal that exits the waveguide to produce an electrical interference cancelation signal; and
using said electrical interference cancelation signal in an interference cancelation operation performed on a received RF signal which includes interference.

14. The method of claim 13, wherein using said electrical interference signal in an interference cancelation operation includes:
combining the received RF signal with the electrical interference cancelation signal.

15. The method of claim 14, wherein using the control signal to control phonon-photon transduction of the acoustic signal which carries the RF signal on to an optical signal being communicated through a waveguide includes:
modifying at least one of: i) a property of a medium through which the acoustic signal travels to reach the waveguide; ii) a property of the waveguide, or iii) a directivity of the transducer.

16. The method of claim 14, wherein using the control signal to control phonon-photon transduction of the acoustic signal which carries the RF signal on to an optical signal being communicated through a waveguide includes:
modifying a property of the medium through which the acoustic signal travels to reach the waveguide or modifying a property of the waveguide, said modifying including heating one or more portions of the medium or waveguide.

17. The method of claim 15, wherein said modifying alters a gain of said phonon-photon transduction.

18. The method of claim 16, wherein said modifying alters a location of said phonon-photon transduction thereby controlling an amount of signal delay.

19. The method of claim 14, wherein using the control signal to control phonon-photon transduction of the acoustic signal which carries the RF signal on to an optical signal includes:
- controlling which of a plurality of differently oriented transducers has a largest phonon-photon transduction gain of the acoustic signal which carries the RF signal on to an optical signal.

20. A radio frequency (RF) interference cancelation apparatus:
- a transducer that oscillates to produce an acoustic signal which carries an RF signal supplied as an input to said transducer;
- a control input that receives a control signal used to control phonon-photon transduction of the acoustic signal which carries the RF signal on to an optical signal being communicated through a waveguide;
- an optical to electrical converter that converts an optical signal that exits the waveguide to an electrical interference cancelation signal; and
- a combiner for combining said electrical interference cancelation signal with a received RF signal which includes interference.

21. The radio frequency interference cancelation apparatus of claim 20, further comprising:
- at least one heating element positioned along a portion of said waveguide or transducer which is controlled by said control signal.

22. The radio frequency interference cancelation apparatus of claim 21, wherein the first transducer is one of a plurality of differently oriented transducers.

* * * * *